US009860317B1

(12) United States Patent
     Gupta

(10) Patent No.: US 9,860,317 B1
(45) Date of Patent: Jan. 2, 2018

(54) THROUGHPUT THROTTLING FOR DISTRIBUTED FILE STORAGE SERVICES WITH VARYING CONNECTION CHARACTERISTICS

(71) Applicant: Amazon Technologies, Inc., Seattle, WA (US)

(72) Inventor: Tarang Gupta, Melros, MA (US)

(73) Assignee: Amazon Technologies, Inc., Reno, NV (US)

( * ) Notice: Subject to any disclaimer, the term of this patent is extended or adjusted under 35 U.S.C. 154(b) by 264 days.

(21) Appl. No.: 14/701,464

(22) Filed: Apr. 30, 2015

(51) Int. Cl.
    H04L 29/08     (2006.01)
    H04L 12/729    (2013.01)
    H04L 12/825    (2013.01)

(52) U.S. Cl.
    CPC ........ H04L 67/1097 (2013.01); H04L 45/125 (2013.01); H04L 47/25 (2013.01)

(58) Field of Classification Search
    CPC ............. H04L 12/2602; H04L 41/5019; H04L 41/0896; H04L 47/10–47/14; H04L 47/215; H04L 67/10–67/141
    See application file for complete search history.

(56) References Cited

U.S. PATENT DOCUMENTS

| | | | |
|---|---|---|---|
| 6,654,772 B1 | 11/2003 | Crow et al. | |
| 6,842,754 B2 | 1/2005 | Muntz | |
| 6,961,341 B1 | 11/2005 | Krishnan | |
| 7,043,637 B2 | 5/2006 | Bolosky et al. | |
| 7,130,917 B2 | 10/2006 | Zhang et al. | |
| 7,228,354 B2 | 6/2007 | Chambliss et al. | |
| 7,240,114 B2 | 7/2007 | Karamanolis et al. | |
| 7,328,274 B2 | 2/2008 | Zhang et al. | |
| 7,685,109 B1 | 3/2010 | Ransil et al. | |
| 7,698,251 B2 * | 4/2010 | Brelsford .......... G06F 17/30489 707/802 | |
| 7,895,352 B2 | 2/2011 | Ageyev et al. | |
| 7,911,958 B2 | 3/2011 | Baden et al. | |

(Continued)

FOREIGN PATENT DOCUMENTS

EP    2031807    3/2009
WO    9938095    7/1999

OTHER PUBLICATIONS

USENIX, "A Directory Index for Ext2", Daniel Phillips, Sep. 19, 2001, pp. 1-13.

(Continued)

*Primary Examiner* — Wing F Chan
*Assistant Examiner* — Raji Krishnan
(74) *Attorney, Agent, or Firm* — Robert C. Kowert; Meyertons, Hood, Kivlin, Kowert & Goetzel, P.C.

(57) ABSTRACT

During a throttling parameter determination, a throttling manager of a file storage service transmits a maximum throughput allotment to an access node of the service. The allotment is based at least in part on the estimated size of a file system instance. The access node assigns respective portions of the allotment to individual ones of a set of persistent client connections classified as sustainable-demand connections, such that the connections are able to sustain their throughputs for a time period. The remainder of the allotment is distributed among one or more high-demand persistent client connections. The access node enforces the throughput limits assigned to the connections.

22 Claims, 10 Drawing Sheets

(56) References Cited

U.S. PATENT DOCUMENTS

| | | | |
|---|---|---|---|
| 8,112,395 | B2 | 2/2012 | Patel et al. |
| 8,112,452 | B2 | 2/2012 | Adya et al. |
| 8,205,090 | B2 | 6/2012 | Oom Temudo de Castro et al. |
| 8,229,985 | B2 | 7/2012 | Turner et al. |
| 8,250,197 | B2 | 8/2012 | Gulati et al. |
| 8,275,902 | B2 | 9/2012 | Philip et al. |
| 8,285,689 | B2 | 10/2012 | Du et al. |
| 8,356,162 | B2 | 1/2013 | Muff et al. |
| 8,429,248 | B1 | 4/2013 | Ketrenos et al. |
| 8,483,194 | B1 | 7/2013 | Wu et al. |
| 8,489,658 | B2 | 7/2013 | Turner et al. |
| 8,539,008 | B2 | 9/2013 | Faith et al. |
| 2002/0138559 | A1 | 9/2002 | Ulrich et al. |
| 2004/0081095 | A1* | 4/2004 | Liu ............... H04W 28/10 370/230.1 |
| 2004/0111308 | A1 | 6/2004 | Yakov |
| 2004/0181605 | A1 | 9/2004 | Nakatani et al. |
| 2004/0236846 | A1* | 11/2004 | Alvarez ........... H04L 12/2602 709/223 |
| 2005/0083845 | A1 | 4/2005 | Compton et al. |
| 2005/0240745 | A1 | 10/2005 | Iyer et al. |
| 2006/0167703 | A1 | 7/2006 | Yakov |
| 2006/0288184 | A1 | 12/2006 | Riska et al. |
| 2007/0076613 | A1 | 4/2007 | Malhotra et al. |
| 2007/0112723 | A1 | 5/2007 | Alvarez et al. |
| 2007/0226332 | A1 | 9/2007 | Becker-Szendy et al. |
| 2007/0297328 | A1 | 12/2007 | Semret et al. |
| 2008/0008094 | A1 | 1/2008 | Gilfix |
| 2008/0031132 | A1 | 2/2008 | Compton et al. |
| 2008/0189700 | A1 | 8/2008 | Schmidt et al. |
| 2009/0003204 | A1 | 1/2009 | Okholm et al. |
| 2009/0240705 | A1 | 9/2009 | Miloushev et al. |
| 2009/0254383 | A1 | 10/2009 | Semret et al. |
| 2010/0036903 | A1 | 2/2010 | Ahmad et al. |
| 2010/0054126 | A1* | 3/2010 | Kwan ............... H04L 47/10 370/235 |
| 2010/0076805 | A1 | 3/2010 | Batsakis et al. |
| 2011/0010427 | A1 | 1/2011 | Jnagal et al. |
| 2011/0099147 | A1 | 4/2011 | McAllister et al. |
| 2011/0138051 | A1 | 6/2011 | Dawson et al. |
| 2011/0301998 | A1* | 12/2011 | Talwar ........... G06Q 10/06316 705/7.26 |
| 2011/0307534 | A1 | 12/2011 | Peng et al. |
| 2011/0320631 | A1* | 12/2011 | Finkelstein ....... H04L 41/0896 709/232 |
| 2012/0054329 | A1 | 3/2012 | Gulati et al. |
| 2012/0089781 | A1* | 4/2012 | Ranade ........... G06F 17/30203 711/118 |
| 2012/0101991 | A1 | 4/2012 | Srivas et al. |
| 2012/0131591 | A1 | 5/2012 | Moorthi et al. |
| 2012/0246637 | A1 | 9/2012 | Kreeger et al. |
| 2012/0311576 | A1 | 12/2012 | Shu et al. |
| 2012/0330954 | A1 | 12/2012 | Sivasubramanian et al. |
| 2013/0042123 | A1* | 2/2013 | Smith ............... G06F 9/5094 713/300 |
| 2013/0081014 | A1* | 3/2013 | Kadatch ........... G06F 9/5027 718/1 |
| 2013/0254373 | A1* | 9/2013 | Cockrell ........... G06F 11/3495 709/224 |
| 2014/0289839 | A1* | 9/2014 | Chen ............... H04L 63/0807 726/9 |
| 2016/0088092 | A1* | 3/2016 | Cardona-Gonzalez H04L 67/141 709/227 |
| 2016/0094413 | A1* | 3/2016 | Jain ............... H04L 41/5019 709/226 |
| 2016/0142323 | A1* | 5/2016 | Lehmann ........... H04L 47/76 709/226 |

OTHER PUBLICATIONS

"HyperDex: A Distributed, Searchable Key-Value Store" Robert Escriva et al., Aug. 13-17, 2012, pp. 1-12.
"Paxos Made Simple", Leslie Lamport, Nov. 1, 2001, pp. 1-14.
2012 Storage Networking Industry Association, "An Overview of NFSv4: NFSv4.0, NFSv4/1, pNFS, and proposed NFSv4.2 features" Jun. 2012, pp. 1-14.
Amazon Web Services "Amazon Virtual Private Cloud, User Guide, API Version" Feb. 1, 2014, pp. 1-155.
"Advanced Load Balancing: 8 Must-Have Features for Today's Network Demands" Citrix Systems, Inc. NetScaler white paper, Sep. 2009, pp. 1-9.
"Citrix Netscaler Load Balancing Algorithms" University of Wisconsin KnowledgeBase, Downloaded from kb.wisc.edu/ns/page.php?id=13201 on Apr. 14, 2013, pp. 1-5.
"Is your load balancer cloud ready? How NetScaler helps enterprises achieve cloud computing benefits" Citrix Systems, Inc. NetScaler white paper, Apr. 2010, pp. 1-9.
"Intel® Data Plane Development Kit (Intel® DPDK) Getting Started Guide", Nov. 2012, pp. 1-18.
"Intel® Data Plane Development Kit (Intel® DPDK) Programmer's Guide", Nov. 2012, pp. 1-90.
"Intel® Data Plane Development Kit (Intel® DPDK) Sample Application User's Guide" Nov. 2012, pp. 1-75.
International Search Report and Written Opinion from PCT/US2014/022916, dated Jul. 11, 2014, Amazon Technologies Inc., pp. 1-20.
U.S. Appl. No. 13/799,386, filed Mar. 13, 2013, Swaminathan Sivasubramanian, et al.
U.S. Appl. No. 13/800,796, filed Mar. 13, 2013, Kiran-Kumar Muniswamy-Reddy, et al.
U.S. Appl. No. 13/926,697, filed Jun. 25, 2015, Wei Xiao, et al.
U.S. Appl. No. 13/926,694, filed Jun. 25, 2013, Stuart Henry Seelye Marshall, et al.
U.S. Appl. No. 13/926,708, filed Jun. 25, 2013, Wei Xiao, et al.
U.S. Appl. No. 13/926,684, filed Jun. 25, 2013, Wei Xiao, et al.
U.S. Appl. No. 14/231,116, filed Mar. 31, 2014, Matti Juhani Oikarinen, et al.
U.S. Appl. No. 14/231,106, filed Mar. 31, 2014, Matti Juhani Oikarinen, et al.
U.S. Appl. No. 14/231,098, filed Mar. 31, 2014, Pradeep Vincent, et al.
U.S. Appl. No. 14/231,095, filed Mar. 31, 2014, Joshua Samuel Hendrickson, et al.
U.S. Appl. No. 14/231,088, filed Mar. 31, 2014, Pradeep Vincent, et al.
U.S. Appl. No. 14/230,378, filed Mar. 31, 2014, Jacob A. Strauss, et al.
U.S. Appl. No. 14/231,077, filed Mar. 31, 2014, Jacob A. Strauss, et al.
U.S. Appl. No. 14/231,070, filed Mar. 31, 2014, Matti Juhani Oikarinen, et al.
U.S. Appl. No. 14/231,063, filed Mar. 31, 2014, Matti Juhani Oikarinen, et al.
U.S. Appl. No. 14/231,057, filed Mar. 31, 2014, Pradeep Vincent, et al.
U.S. Appl. No. 14/701,462, filed Apr. 30, 2015, Jacob David Luszcz, et al.

* cited by examiner

THROUGHPUT THROTTLING FOR DISTRIBUTED FILE STORAGE SERVICES WITH VARYING CONNECTION CHARACTERISTICS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Some large provider networks implement a variety of storage services, such as services that implement block-level devices (volumes) or objects that can be modeled as arbitrary bit buckets accessible via respective URLs (uniform resource locators). However, a number of applications running at data centers of a provider network may still face limitations with respect to their use of some of the more common storage-related programmatic interfaces, such as various industry-standard file system interfaces. Some industry-standard file systems may have been designed prior to the large-scale deployment of network-accessible services, and may therefore support consistency models and other semantics that are not straightforward to implement in distributed systems in which asynchronous interactions, failures of individual components and network partitions or networking-related delays are all relatively common.

Distributed implementations of file systems may also have to deal with more complex workload balancing problems than, for example, have to be handled with respect to web-services applications relying on stateless protocols such as HTTP (Hypertext Transfer Protocol). For example, connections established from client devices to the components of a distributed file system may sometimes persist for long durations, with each connection being used for many different reads or writes. The rates at which requests are received via such a persistent connection, and the amount of file system data typically read or written per request, may vary substantially over time. Especially in provider network environments handling tens of thousands of concurrent file system users, managing diverse and time-varying throughput requirements for persistent connections may present a non-trivial challenge.

Figure 1:
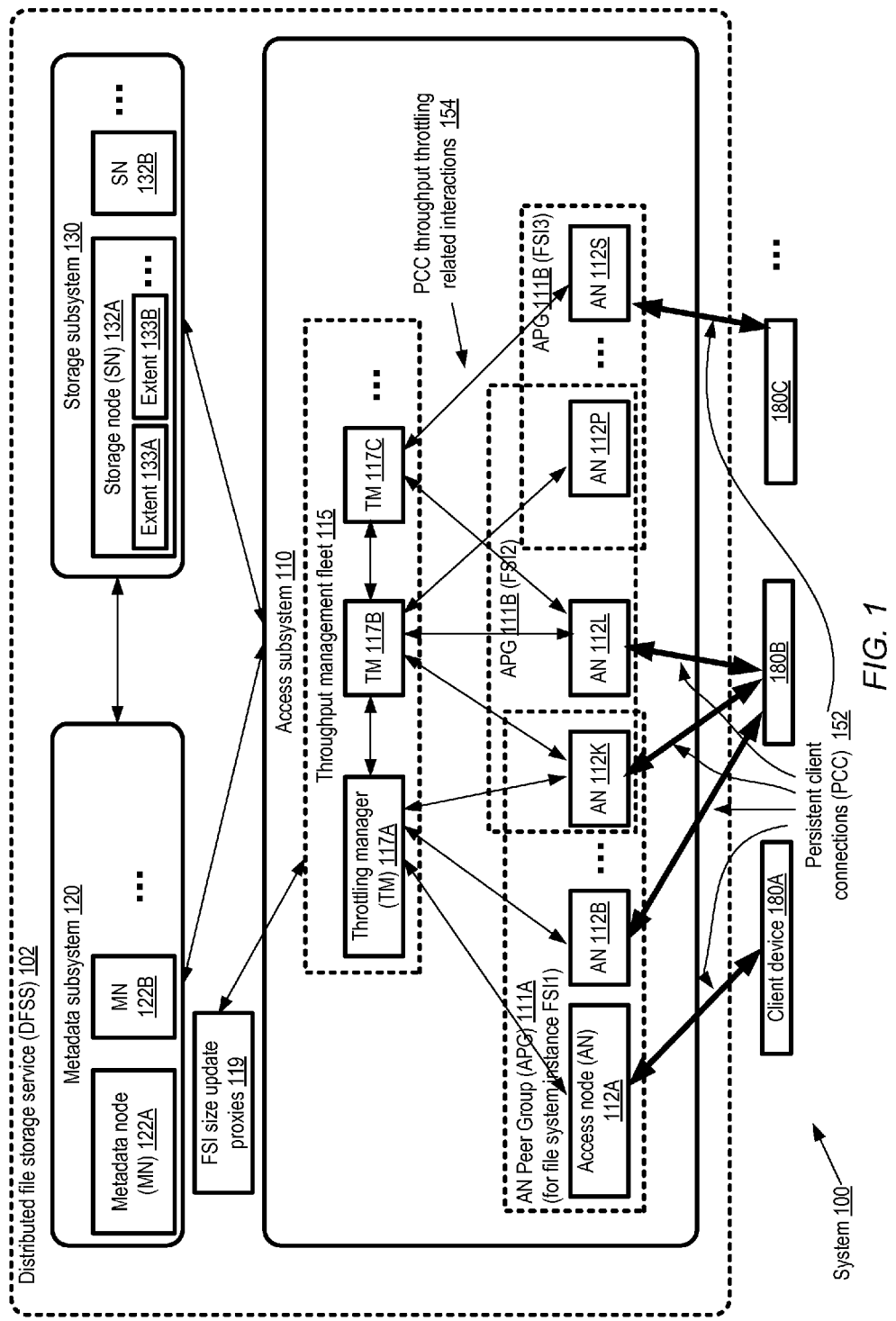
FIG. 1 illustrates an overview of a system in which a distributed file storage service may be implemented at a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for throughput throttling at a large-scale distributed file storage service (DFSS) are described. In at least some embodiments, the DFSS may be designed to support shared access to files by thousands of clients, where each individual file may comprise very large amounts (e.g., petabytes) of data, at performance, availability and durability levels that are targeted to be independent of the size of the file and/or the number of concurrent users. One or more industry-standard file system interfaces or protocols may be supported by the DFSS, such as various versions of NFS (network file system), SMB (Server Message Block), CIFS (Common Internet File System) and the like. The DFSS may be intended for use by a wide variety of applications, such as file content serving (e.g. web server farms, software development environments, and content management systems), high performance computing (HPC) and "Big Data" applications such as media, financial, and scientific solutions requiring on-demand scaling of file store capacity and performance. In at least some implementations, the DFSS may be engineered so as to enable clients to collectively create hundreds of thousands of file system instances (FSIs) (e.g., using the logical equivalent of a respective "mkfs" system call for each file system instance, followed by the logical equivalent of a "mount" call for a root directory of the file system instance).

To help enable high levels of scalability, a modular architecture may be used for the DFSS in at least some embodiments. For example, a physical storage subsystem comprising some number of multi-tenant storage nodes may be used for file store contents, while a logically distinct metadata subsystem with its own set of metadata nodes may be used for managing the file store contents in one implementation. The logical separation of metadata and data may be motivated, for example, by the fact that the performance, durability and/or availability requirements for metadata may in at least some cases differ from (e.g., be more stringent than) the corresponding requirements for data. A front-end access subsystem, with its own set of access nodes distinct from the metadata and storage nodes, may be responsible for exposing network endpoints that allow clients to submit requests to create, read, update, modify and delete the file stores (and objects within the file stores) via the industry-standard interfaces and/or custom interfaces. The access subsystem (which may also be affiliated with or include additional entities such as a pool of throttling managers as described below) may be responsible for handling connection management, throughput throttling and other load-balancing-related operations, authentication, authorization as well as other tasks associated with client interactions in various embodiments. Resources may be deployed independently to any one of the subsystems in some embodiments, e.g., to the access subsystem, the metadata subsystem, or the storage subsystem, without requiring corresponding deployment changes at the other subsystems. For example, if a triggering condition such as a potential performance bottleneck is identified in the access subsystem, or if some set of access nodes experience a network outage or other failure, additional access nodes may be brought online without affecting the storage or metadata subsystems, and without pausing the flow of client requests. Similar deployment changes may be made at other subsystems as well in response to various types of triggering conditions. In at least some embodiments, the contents of the file store metadata objects (e.g., data structures representing attributes of directory entries, links, etc.) may themselves be stored on devices managed by the storage subsystem. The term "file store object" may be used herein to refer collectively to data objects such as files, directories and the like that are typically visible to clients of the DFSS, as well as to the internal metadata structures (including for example mappings between logical blocks, physical pages and extents), used to manage and store the data objects.

In at least some embodiments, the DFSS may be built using resources of a provider network, and may be designed primarily to fulfill storage requests from other entities within the provider network. Networks set up by an entity such as a company or a public sector organization to provide one or more network-accessible services (such as various types of cloud-based computing or storage services) accessible via the Internet and/or other networks to a distributed set of clients may be termed provider networks herein. Provider networks may sometimes be referred to as "public cloud" environments. Some of the provider network services may be used to build higher-level services, or for administrative purposes by other services: for example, a virtual computing service or a database service may be used as building blocks for some of the components of the DFSS in at least some embodiments. In one embodiment, the file storage service may be accessible from some subset (or all) of the computing platforms (e.g., the guest virtual machines and virtualization hosts) of a virtual computing service of the provider network, e.g., as a result of assigning the appropriate network addresses to the access nodes of the storage service, implementing the authorization/authentication protocols that are used for the virtual computing service, and so on. In some embodiments, clients outside the provider network (e.g., from various devices attached to the Internet) may also be provided access to the DFSS.

In one embodiment, at least some of the provider network services may implement a usage-based pricing policy—e.g., customers may be charged for a virtual machine based at least partly on how long the instance was used, or on the number of requests of various types that were submitted from the virtual machine. In at least some such embodiments, the DFSS may also employ usage-based pricing for at least some categories of client requests—e.g., the service may keep records of the total size of a given file system instance (which corresponds to the storage space used), and/or the total number of bytes read or written to the file system instance, and may generate billing amounts for the customer on the basis of such records. The DFSS may support high levels of data durability in some embodiments, e.g., using any of a number of different replication techniques, which may also impact the total storage used. For example, in one embodiment, file store data and metadata may be physically stored using storage units called extents, and the contents of an extent may be replicated at various physical storage devices. A given modification request from a client may accordingly be translated into a plurality of physical modifications at respective storage devices and/or respective storage subsystem nodes, depending on the nature of the replication policy in use for the corresponding file store object or metadata.

In various embodiments, in order to access a particular file system instance, a persistent connection may be established between a client device (e.g., a computing device at which one or more applications belonging to a customer are executed) and an access node of the DFSS. In embodiments in which a variant of the NFS protocol is supported, for example, such a persistent connection may be established to the DFSS from a kernel-mode NFS client component on a client device. Multiple requests directed at the file system instance may be initially generated at an application process at the client device, passed from the application process to the kernel-mode client component, and transmitted via the same persistent connection to an access node of the DFSS. Depending on the nature of the client's request, one or more corresponding internal requests may be transmitted by the access node to one or more back-end nodes (e.g., metadata nodes or storage nodes) of the DFSS. Responses may be generated at the back-end node(s) and/or the access nodes, and provided to the client using the reverse of the path used for the requests. In at least some embodiments, several different access nodes may be designated as members of an access node peer group (APG) for a given file system instance, and a given sequence of client requests may be directed via an intermediary such as a hardware or software load balancer to one of the APG members using a persistent connection. In various embodiments, a given connection between a client device and an access node may be expected to remain in operation for a potentially long period of time (e.g., hours) and be used for multiple request-response pairs. Such connections between the clients and the access nodes may be termed persistent client connections (PCCs). In at least some embodiments, the access nodes may typically be responsible for continuing to service requests received on a given PCC until the PCC is closed at the initiative of the client (i.e., either the kernel-mode client component, or the application-layer client), although under some conditions an access node may also close a PCC. In some embodiments, the traffic corresponding to a given PCC may pass through on or more intermediary devices (such as load balancers) between client devices and the access nodes. In such embodiments, a logical persistent client connection between a client and the DFSS may consist of several lower-level persistent connections—e.g., one connection between a client device and a load balancer, and another between the load balancer and the access node.

The rate at which requests (and corresponding responses) flow over a given PCC may change over time. Accordingly, the throughput (bytes transferred over the PCC, primarily for client-requested reads and/or writes) of a given PCC may also vary over time. In some embodiments, the DFSS may attempt to guarantee (or at least make a best effort to provide) a total throughput for a given file system instance as a function of the file system instance size (e.g., as a baseline, X megabytes/second of aggregated read and write throughput may be provided for each terabyte of data stored at the file system instance). However, a given file system instance may have many different PCCs active at a given time (e.g., corresponding to respective client-side application threads, potentially running at numerous client devices). The requested throughput of one PCC (say, PCC-j) during a given time interval may differ substantially from the requested throughput of another PCC (PCC-k), and may also differ substantially from its PCC-j's own requested throughput during a different time interval. Furthermore, during some time periods, the request rate (or total bytes requested) may spike to a much higher value than the overall average for a given PCC during some time periods, while remaining well below the average for a different PCC, and the DFSS may need to accommodate such bursty behavior at least for short intervals. The problems of throughput management on a file system instance level may be further compounded by the fact that a given file system instance may be accessed from geographically distributed locations (e.g., via access nodes that may be located in a variety of data centers distributed around the world).

Accordingly, to handle the fluctuating and potentially bursty performance requirements of numerous potentially geographically dispersed PCCs gracefully, while generally providing increased performance to some requests, and at the same time ensuring that at least a minimal level of service is provided to each customer's requests, the DFSS may implement a distributed asynchronous throughput throttling mechanism in various embodiments. In some embodiments, a pool of throttling managers (TMs) may be established, either as part of, or closely affiliated with, the access subsystem. Each TM may be designated to determine throttling parameters for each of one or more file system instances (FSIs). As the throttling parameter determinations may be performed iteratively in at least some embodiments, the operations performed at the throttling managers may be referred to herein as throttling parameter determination iterations (TPDIs). In a given TPDI, a TM may utilize information collected from a variety of sources to determine values for one or more throttling parameters, including for example a respective maximum throughput allotment (MTA) and/or a minimum guaranteed throughput (MGT) for each of a set of access nodes. The information collected may include, for example, local throughput metrics obtained from at least some of the ANs, indicating the requested or provided throughput for some set of PCCs during a recent time interval, as well as aggregated throughput and/or connection count metrics obtained from other peer TMs designated for the same file system instance. In addition, in at least some embodiments, the information collected by a TM may include current estimates (or exact values) of the sizes of various file system instances. The collected information may be used by the TM to generate a global view of the sizes, number of active connections, and recent throughput demands of various file system instances for whose throughput throttling the TM is responsible. The MTA and the MGT may vary as a function of the size of the file system instance in various embodiments—e.g., as the file system instance grows, the total allowed throughput (across all the PCCs being used for that file system) and/or the minimum throughput guaranteed per PCC may be increased.

In at least some embodiments, as described below in further detail, a TM may also be responsible for implementing "bursty" request management, e.g., using a token-based mechanism as described below. In one such token-based burst management technique, throughput "credits" or tokens may be banked or accumulated for each file system instance based on various factors (such as a default token refill rate and/or the size of the file system instance). The tokens may be consumed at a rate proportional to the throughput of the PCCs of the file system instance, and short periods of very high throughput may be permitted as long as sufficient tokens are available.

Respective throttling parameters generated during a particular TPDI for a given set of PCCs associated with one or more file system instances may be transmitted to the appropriate ANs in various embodiments. Each AN in such embodiments may classify its PCCs into a set of categories, including for example a sustainable-demand (SD) category and a high-demand (HD) category, e.g., based on the minimum guaranteed throughput (MGT) and/or on locally collected throughput metrics of the PCCs. (Raw local throughput metrics collected over some number of time intervals may be aggregated in some implementations using a time-decay function, so that more recent metrics are assigned a higher weight or importance than older metrics). For example, those PCCs whose throughput metric is less than or equal to the MGT may be classified as SD, while those whose throughput metric is higher than the MGT may be classified as HD. In some embodiments, the AN may then distribute its MTA (maximum throughput allotted) as follows. First, all the SD PCCs (if any PCCs have been classified as SD) may be assigned enough throughput, for the next time slot being considered, to continue at their current throughput level. Then, the remainder of the MTA (i.e., the throughput remaining after the SD PCCs have been assigned their throughputs, if such a remainder exists) may be distributed among the HD PCCs (if any HD PCCs exist). A simple example of the manner in which a given AN may distribute the available throughput in some embodiments is provided in FIGS. 3a and 3b and described below. Any of a number of distribution mechanisms may be used for the HD PCCs in different embodiments—e.g., the remainder throughput may be distributed equally among all the HD PCCs, or it may be distributed in proportion to their relative bandwidth demands. If the throughput assigned to a given PCC is below its demand, in various embodiments the AN may implement a response pacing mechanism to ensure that the actual throughput provided does not exceed the assigned throughput—e.g., delays may be introduced between responses to various client requests such that the achieved throughput as experienced by the client remains at or below the assigned throughput.

The computations performed by the TM to arrive at the throttling parameters may in most cases ensure that each PCC can be granted the minimum guaranteed throughput (although a lower throughput may be assigned to a PCC if the MGT is higher than the demand of the PCC), and that any remaining throughput is distributed among those PCCs that have greater demand. Each AN may aggregate its local connection information (e.g., connection count and respective assigned or measured throughputs) and transmit it to one or more TMs periodically in various embodiments. Different TMs may collect local throughput data from respective sets of ANs, and exchange that information with peer TMs (e.g., using a gossip-based protocol or a different protocol that does not require strict synchronization). In general, the throttling techniques implemented in various embodiments may be designed to withstand various types of failures and delays that may typically be expected in large-scale distributed environments. For example, if an AN does not receive updated throttling parameters from a TM with which it was previously communicating, the AN may attempt to discover and contact a different peer TM, or simply proceed using the latest throttling parameters it has received. Even if the throttling decisions made by the AN are sub-optimal under such circumstances, eventually the AN would be expected to connect to a TM which can provide it with the appropriate parameters. Similarly, if a TM computes throttling parameters based on incomplete or stale information (e.g., if a message from one of its peer TMs has been delayed or lost), the effect of using those parameters may only last for a short time, until that TM eventually gets a consistent view of the state of various file system instances.

In order to be able to withstand various unexpected scenarios or to deal with unusual situations, in at least some embodiments various types of special-purpose policies which may be termed "override policies" may be supported. For example, if a particular customer's high throughput needs for a given file system instance (say, FSI-k) are to be accommodated despite the small size of FSI-k, an override policy that increases FSI-k's apparent size (for the purposed of throttling parameter determination) may be implemented in one embodiment. In some embodiments, override policies at several different granularities may be supported—e.g., FSI-specific override policies (applied to a single file system instance), customer-specific override policies (applicable to multiple file system instances of a given customer), and global override policies (applicable to all file system instances).

Example System Environment

FIG. 1 illustrates an overview of a system in which a distributed file storage service may be implemented at a provider network, according to at least some embodiments. As shown, system 100 includes several subsystems of a modular distributed file storage service (DFSS) 102, including an access subsystem 110, a metadata subsystem 120, and a storage subsystem 130. The access subsystem 110 may include a plurality of access nodes (ANs) 112, configured as endpoints with which clients of the DFSS may interact to submit various types of file system operations. Access nodes may also be referred to as "hubs" in some environments. In the depicted embodiment, any given AN may be configured to receive client requests directed at one or more file system instances (FSIs) in the depicted embodiment, and a plurality of ANs may form an AN peer group (APG) 111 collectively responsible for processing client requests directed at a given FSI. For example, APG 111A comprising ANs 112A, 112B and 112K may have been established for a file system instance FS1. Similarly, APG 111B comprising ANs 112K, 112L and 112P is set up for a file system instance FSI2, while a third APG 111C comprising ANs 112P and 112S may be responsible for handling requests directed at a third file system instance FSI3.

The DFSS may implement any of a number of different file system protocols or standards in various embodiments, such as variants of NFS, CIFS and/or SMB. For at least some such protocols, persistent client connections (PCCs) 152 may be established between client computing devices 180 (e.g., 180A, 180B or 180C) and one or more ANs 112. In various embodiments, a software or hardware load balancer layer (not shown in FIG. 1) may be set up as an intermediary between the client devices 180 and the ANs. A load balancer to be used for a given FSI may be assigned a particular network address (e.g., a virtual IP (Internet Protocol) address), and the clients may send their requests corresponding to the given FSI to the load balancer. The load balancer may then forward the request along a particular PCC 152 to a selected AN 112 of an APG 111 associated with the given FSI. In some embodiments, a separate load balancer layer may not necessarily be used.

In response to receiving a client request via a PCC 152, an AN 112 may determine which (if any) back-end components (e.g., metadata nodes 122 and/or storage nodes 132) are to participate in the fulfillment of the request. For some types of requests, the AN 112 may be able to respond to the client's request without interactions with the back-end storage or metadata subsystems in at least some embodiments—e.g., some ANs may maintain local caches of file system metadata and/or data which can be used for the client requests. For other types of requests, the AN may transmit internal requests to one or more metadata nodes (MNs) 122 and/or one or more storage nodes (SNs) 132. In at least some embodiments, the data and/or metadata of the DFSS may be stored in replicated units called extents, such as extents 133A and 133B. In order to identify exactly which extents are to be read or written to respond to a given client request, various types of metadata such as block maps or page maps may have to be consulted with the help of selected metadata nodes 122, and the appropriate storage nodes 132 to which internal requests should be directed may thereby be identified. Internal responses received from the metadata subsystem 120 and/or the storage subsystem 130 may be used to generate the responses provided to the clients from the AN via the PCCs 152.

Based on their service level agreements, customers of the DFSS may typically expect the performance of their file systems to scale as the file systems grow larger. Furthermore, the rate at which data is read and/or written via a given PCC may vary dramatically over time, and the number of PCCs associated with a given FSI may change over time as well (e.g., as new connections are established from additional client devices 180). Other factors such as geographical dispersion of the set of nodes (ANs, MNs and SNs) responsible for a given may also complicate the resource allocation task of the DFSS in various embodiments—e.g., some requests to a given FSI may be received at one data center, while other requests may have to be handled at a second data center.

In order to provide the desired service levels, at least with respect to throughput, a distributed fault-resilient throughput throttling technique may be implemented using a throughput management fleet 115 in the depicted embodiment. As shown, the fleet 115 may comprise a plurality of throttling managers (TMs) 117, such as TM 117A, 117B, and 117C. The TMs 117 may each be responsible for implementing a sequence of throttling parameter determination iterations (TPDIs) using a variety of input data as described below, and periodically communicating throughput control parameters such as the maximum (and/or minimum) allotted throughput for a given set of PCCs 152 to the ANs 112. The ANs may classify their local PCCs into two or more categories in the depicted embodiment, e.g., on the basis of measured throughputs over some recent number of time periods as described below, and distribute the available throughput among the PCCs for the next time period based on the parameters provided by the TM. For those PCCs whose demand exceeds the allotted throughput, the AN may implement response pacing so as to enforce the allocated throughput limits in various embodiments—e.g., by adding delays between successive responses.

In a given TPDI, a TM may use information gathered from a number of different sources to compute the next set of throttling parameters to be provided to a given AN 112. For example, a particular TM 117 may be designated (sometimes collectively with other TMs) for throughput management of a given FSI in some embodiments, and may collect local throughput and PCC count metrics from a set of ANs 112 that are also designated for that FSI. In addition, the TM 117 may collect updated measures or estimates of the sizes of various file system instances, e.g., from sources other than the ANs 112 (since at least in some implementations, the ANs 112 may not have direct access to file system size metadata). In some embodiments, a set of size update proxies 119 may be responsible for collecting FSI size information (e.g., from the metadata subsystem or from the storage subsystem) and providing updated FSI sizes to the TMs 117. In other embodiments, a TM may directly communicate with one or more metadata nodes 122 and/or storage nodes 132 to obtain at least an estimate of the sizes of various subsystems.

In various embodiments, the TMs may use a token-based scheme to handle bursty demands gracefully, as described below in further detail. For example, a respective token collection called a "token bucket" may be established for each FSI and populated with an initial number of tokens, with each token representing a number of bytes of data transfer permitted for that FSI. Tokens may be removed from the token bucket based on the throughputs reported for the PCCs of the FSI by the ANs, and new tokens may be added to the buckets based on any of various refill policies (such as a policy in which the refill rate increases with the FSI size). In at least some throttling parameter messages sent to the ANs, the TMs may provide token population counts, which may then be used to allow the ANs to support demand bursts as long as tokens remain available in some embodiments. In some implementations, a back-end persistent repository (e.g., a relational or non-relation database system, not shown in FIG. 1) which may be accessible from various TMs of fleet 115 may be used to store representations of the token buckets and/or store other throttling metrics and parameters.

In at least one embodiment, the TMs 117 may also exchange messages with one another, containing information which can be helpful in determining throttling parameters. In one implementation, for example, in which multiple peer TMs may be designated to implement throttling for a given file system instance, the peer TMs may use a gossip-based protocol to exchange the local throughput information aggregated from their respective sets of ANs, and/or FSI size information. The protocol used for information exchange between the TMs may be designed to support "eventual" consistency, rather than, for example, strict consistency in various embodiments. That is, the set of information available regarding a given FSI at two peer TMs, TM1 and TM2, may eventually be expected to converge (assuming that any failures in the system are repaired). The algorithms used to manage PCC throughputs may continue to work at least reasonably well even if the information at TM1 diverges temporarily from the information available at TM2. In various embodiments, the TPDIs of a given TM may be scheduled and performed asynchronously and independently with respect to the TPDIs of other TMs; thus, strict synchronizations among the TMs may not be required. Similarly, temporary failures in communications at various levels—e.g., between the ANs and the TMs, or between the TMs and the FSI size update proxies, or between various other nodes, may all be handled gracefully, without impacting the levels of service provided to the customers of the DFSS for extended periods of time. Any of several different types of information dissemination protocols may be used for the various interactions described above in different embodiments. In some embodiments, a "pull" protocol may be used for obtaining local throughput data periodically from the ANs at a TM, or a "push" protocol in which the AN sends its data to a TM at its own initiative may be used, or some combination of push and pull techniques may be used. Piggybacking of throttling information (e.g., either the local throughput data being sent from the ANs to the TMs, or the throttling parameter set being sent in the reverse direction) on other types of messages such as health state management messages or "heartbeats" may be used in various embodiments.

In at least some embodiments, based at least in part on the throttling parameters received from a TM, an AN may determine a minimum guaranteed throughput (MGT) for each of the PCCs of a given FSI. The AN may use the MGT as a classification parameter, together with throughput measurements it has collected locally for the PCCs, to classify the PCCs into at least two categories in the depicted embodiment: (a) a sustainable-demand (SD) category and (b) a high-demand (HD) category. For example, if the MGT is 20 Mbytes/second, and recently collected local metrics indicate that a particular PCC, PCC-1, is likely to require no more than 20 Mbytes/second for the next time slot being considered, the AN may classify PCC-1 in the SD category. In contrast, a different PCC, PCC-2, which has recently been requesting throughput of 50 Mbytes/second, may be classified as HD. The AN may then divide the maximum throughput allotment for the time slot as follows in at least some embodiments: first, each SD PCC may be assigned sufficient throughput to sustain its ongoing demand, and then, the remainder of the throughput may be distributed among the HD PCCs (e.g., either equally, or in proportion to their expected demands). Having assigned the throughputs for the time slot to each of its active PCCs, the AN may then enforce those limits, e.g., by adding delays between requests if necessary to ensure that none of the PCCs exceeds its assigned level. The actual throughput used by each of the PCCs during the time slot may then be measured, and included in a next set of local throughput measures sent to one or more TMs (together with an indication of any closed PCCs or newly-established PCCs); that information may then be used by the TM in addition with its other information sources to arrive at the next iteration of throttling parameters. In this way, the TMs and the ANs may collectively adjust the throughput assignments to various PCCs, ensuring that each PCC gets at least a minimum throughput in each time slot, while generally distributing the available throughput based on FSI size and/or on the relative demands of the different PCCs.

Throttling Manager and Access Node Subcomponents

Figure 2:
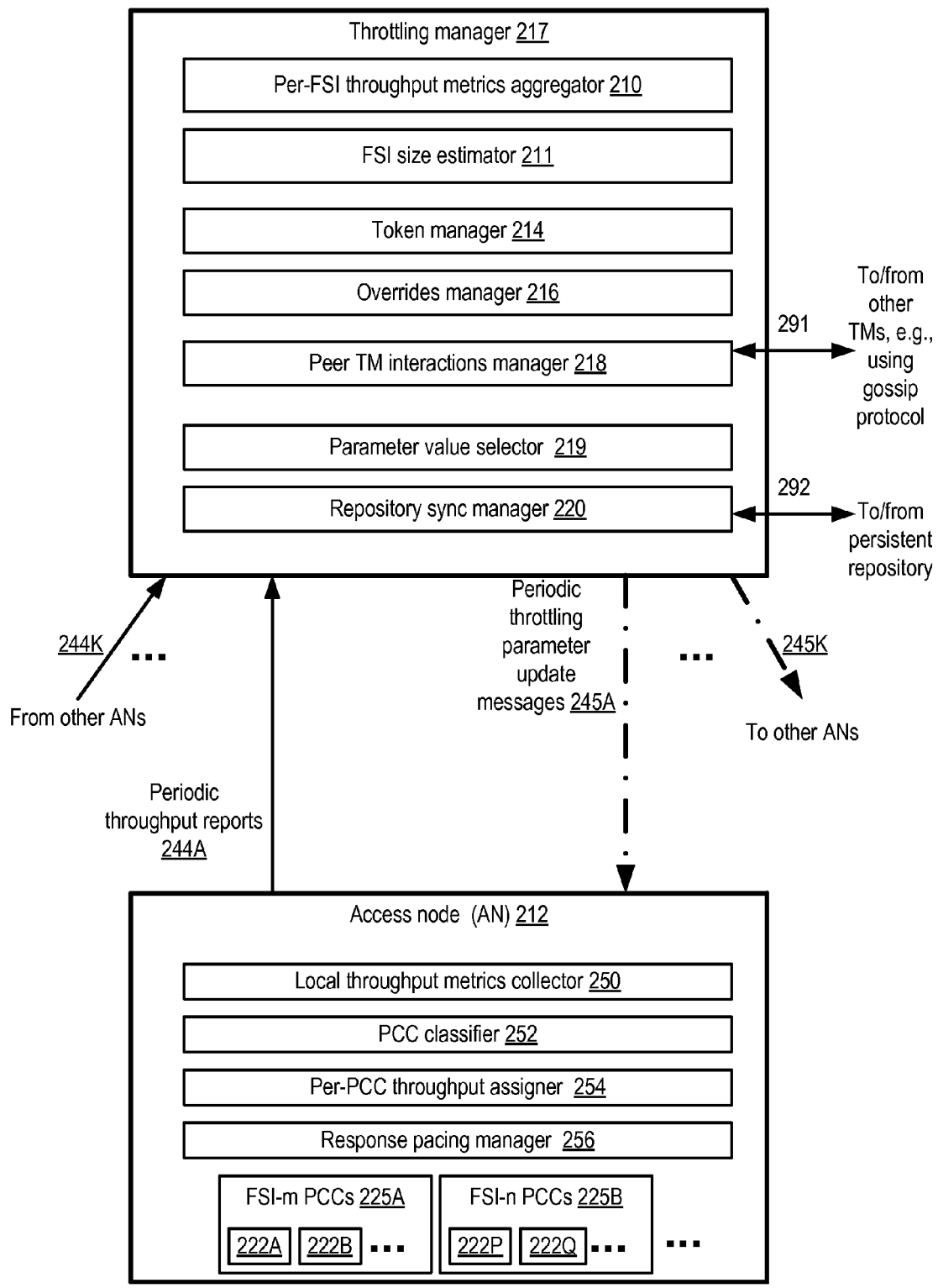
FIG. 2 illustrates example subcomponents of a throttling manager and an access node of a distributed file storage service, according to at least some embodiments.

FIG. 2 illustrates example subcomponents of a throttling manager and an access node of a distributed file storage service, according to at least some embodiments. The AN 212 may have PCCs established for numerous different FSIs, and similarly, the TM 217 may be responsible for determining throttling parameters for a number of different FSIs in the depicted embodiment. As shown, the TM 217 may include a per-FSI throughput metrics aggregator 210, an FSI size estimator 211, a token manager 214, an overrides manager 216, a peer-TM interactions manager 218, a parameter value selector 219, and a repository sync manager 220 in the depicted embodiment.

The per-FSI metrics aggregator 210 may combine local throughput and connection metrics provided by the ANs for each FSI e.g., via the periodic throughput reports 244A-244K. In some embodiments the per-FSI metrics aggregator 210 may combine the information received from the ANs directly with similar metrics received from peer TMs with respect to ANs that are not directly in contact with the TM 217. The FSI size estimator may determine, e.g., based on information collected from size update proxies and/or from the metadata subsystem or storage system, the current size of each FSI for which the TM 217 is responsible. The token manager 214 may use token management parameters of the kind described below with respect to FIG. 5 and locally-stored representations of respective token buckets for each of the FSIs to determine the available token information to be communicated to the ANs. Overrides manager 216 may be responsible for determining whether any override policies are to be applied at the TM 217 during at least the current throttling parameter determination iteration (TPDI), e.g., by communicating with various control-plane or administrative components of the DFSS. If one or more override policies are to influence the throttling parameters, the overrides manager 216 may inform one or more of the other components. The peer TM interactions manager 218 may communicate with other TMs whose portfolios of managed FSIs intersect with the set of FSI for which the TM 217 is responsible. Any of various mechanisms or protocols, including gossip-based protocols, push-based or pull-based protocols, may be used for messages 291 exchanged with other TMs in different embodiments. The repository sync manager 220 may periodically store token bucket information, FSI size information, and/or various throttling-related parameters to a persistent repository in the depicted embodiment, and/or read updates from such a repository, as indicated by arrow 292. The parameter value selector 219 may use the collected information and compute the particular sets of throttling parameters to be sent to the ANs via the periodic throttling parameter update messages 245A-245K. In some embodiments, some or all of the components of the TM 217 shown in FIG. 2 may be implemented as respective threads or processes, while in other embodiments some or all of the functions described with respect to the components may be collectively implemented at a single thread or process. In various embodiments, the communications between the TMs and other entities (such as the ANs, the peer TMs, sources of FSI size information, and/or the repository) may each comprise respective asynchronous sets of iterations—e.g., the repository interactions may be scheduled once every W seconds on average, peer TMs may be contacted once every X seconds on average, FSI size information may be collected every Y seconds on average, ANs may be contacted once every Z seconds on average.

The AN 212 may manage respective sets of PCCs for respective FSIs in the depicted embodiment—for example, FSI-m PCCs 255A may include PCCs 222A and 222B, while FSI-n PCCs 225B may include PCCs 222P and 222Q. The number of PCCs used for any given FSI may change over time, and the number of FSIs for which requests are being handled at AN 212 may change over time as well. The AN may include, for example, a local throughput metrics collector 250 (or multiple collectors) to obtain the actual and/or requested throughputs of the various PCCs 222 and provide them to the TM 217 in the form of periodic throughput reports such as 244A. PCC classifier 252 may categorize the PCCs based on their measured or requested local throughputs and on classification parameters (such as minimum guaranteed throughputs) obtained from a TM in various embodiments; an example of such a classification is provided in FIGS. 3a and 3b and described below. The Per-PCC throughput assigner 254 may use the received throttling parameters and the results of the PCC classification to allocate or assign respective portions of the available throughput. If any of the PCCs' demands exceed their assigned throughput limits, in at least some embodiments the response pacing manager 256 may enforce the limits, e.g., by introducing delays between responses and/or by introducing delays between the internal requests sent to the metadata subsystem or the storage subsystem on behalf of client requests. As in the case of the TM 217, some or all of the subcomponents of AN 212 may be implemented at respective threads or processes in various embodiments. In at least some embodiments, one or more of the subcomponents of the TM 217 and/or the AN 212 shown in FIG. 2 may not be implemented; for example in one embodiment a persistent repository may not be used, and as a result a repository sync manager may not be required.

Throttling Workflow Example

Figure 3A:
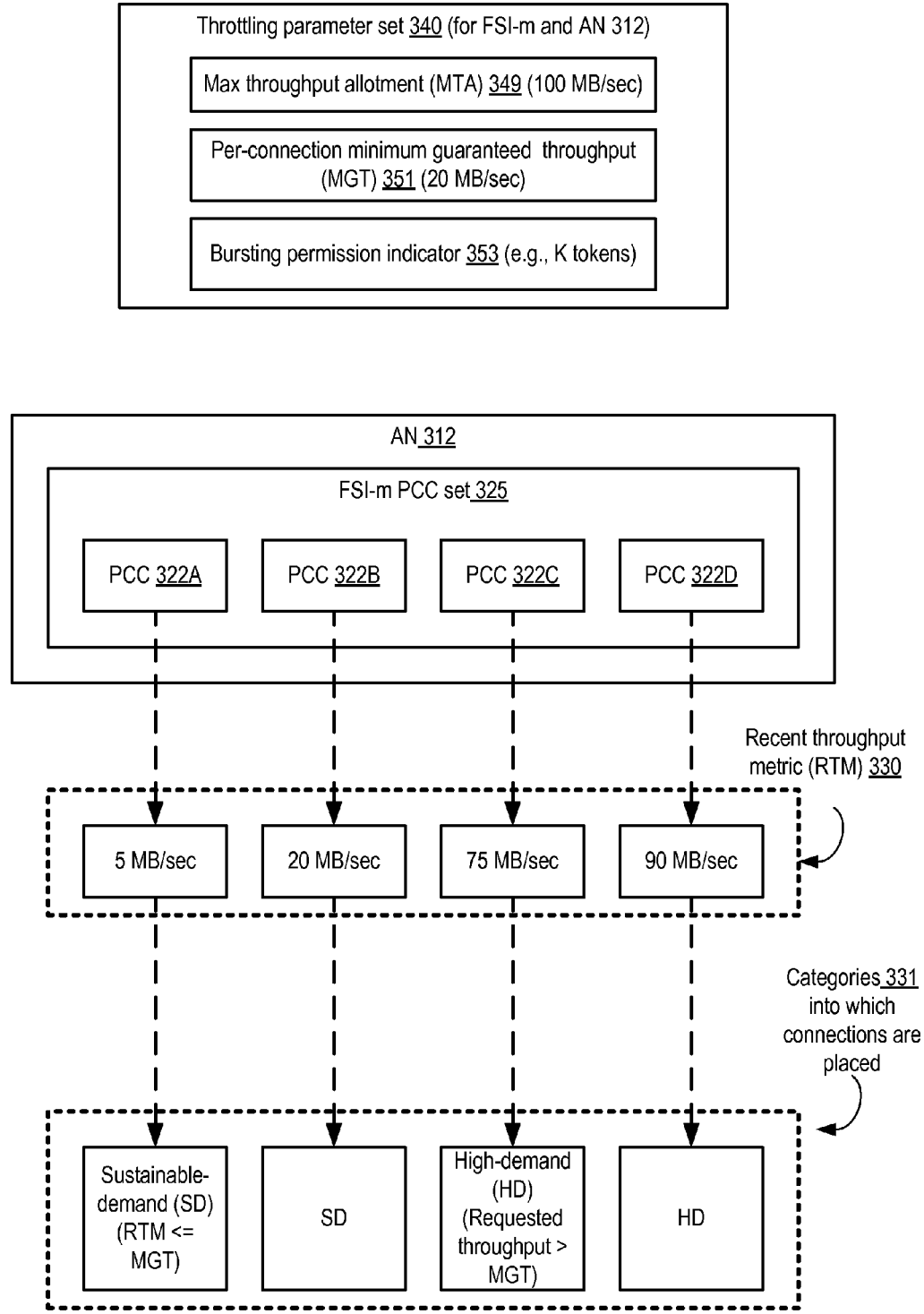
FIG. 3a and FIG. 3b collectively illustrate an example use of a throughput throttling technique which may be implemented at an access node of a distributed file storage service, according to at least some embodiments.
Figure 3B:
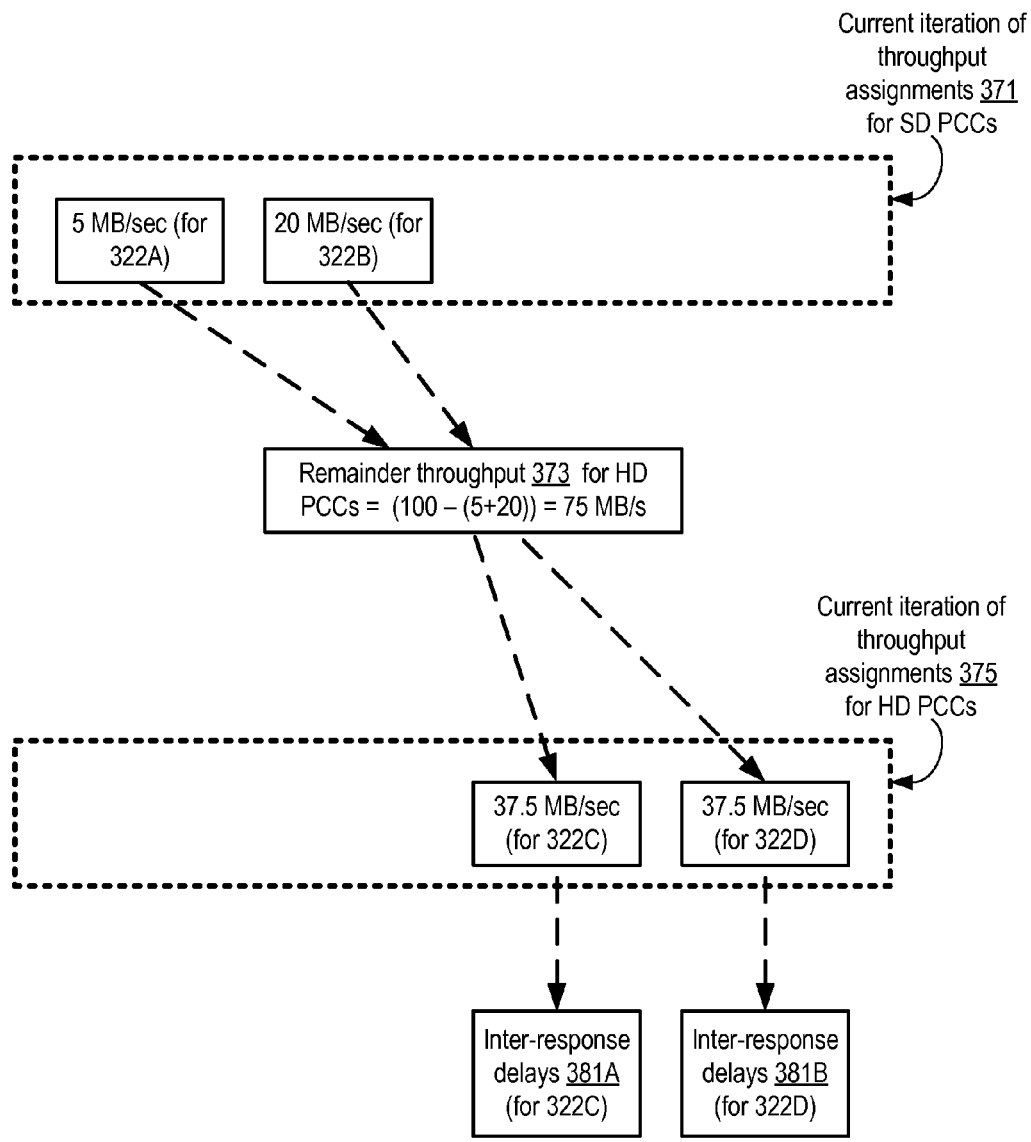

FIG. 3a and FIG. 3b collectively illustrate an example use of a throughput throttling technique which may be implemented at an access node of a distributed file storage service, according to at least some embodiments. A set of throughput throttling parameters 340 corresponding to a particular FSI (FSI-m) may be provided to an AN 312 in the depicted example by a throttling manager (TM). To simplify the presentation, the AN 312 is shown with only four PCCs, all configured for clients accessing a single FSI (FSI-m). The parameters may include a maximum throughput allotment (MTA) 349 of a 100 Mbytes/sec, a minimum guaranteed per-PCC throughput 351 of 20 Mbytes/second, and a bursting permission indicator 353 indicating that K tokens are available in a token bucket set up for FSI-m.

The AM 312 may have been collecting throughput measurements locally for all its PCCs. In at least some embodiments, for example, records of the throughput requested (and/or provided) to each PCC 322 of FSI-m's PCC set 325 may be retained for some number of consecutive time slots (e.g., for T slots of K milliseconds each). The measurements for several of the slots may be combined, e.g., using a time-decay function in which the more recent measurements are given a greater weight than the older measurements, to obtain a recent throughput metric (RTM) 330 for each of the PCCs 322A, 322B, 322C and 322D. In the example scenario shown, the respective values of the recent throughput metrics for the four PCCs are 5 Mbytes/sec (for 322A), 20 Mbytes/sec (for 322B), 75 Mbytes/sec (for 322C) and 90 Mbytes/sec (for 322D).

Based on the RTMs of the PCCs and the MGT obtained from the throttling manager as a classification parameter, the AN 312 may classify the PCCs 322 into two categories in the depicted example scenario: a sustainable-demand (SD) category and a high-demand (HD) category. The PCCs with RTMs less than or equal to the minimum guaranteed throughout, such as PCCs 322A and 322B, may be placed in the SD category, and the remaining PCCs 322C and 322D may be placed in the HD category. As shown in element 371 of FIG. 3b, the AN 312 may first assign respective throughputs (for the time slot being considered) to each SD connection, sufficient to sustain the RTM. Thus, PCC 322A may be granted an allotment of 5 Mbytes/sec, and PCC 322B may be assigned 20 Mbytes/sec. This assignment of a total of 25 Mbytes/second to the two SD PCCs may leave a remainder throughput 373 (with respect to the MTA of 100 Mbytes/second) of 75 Mbytes/second. In the depicted example, the AN 312 may distribute the remainder 75 Mbytes/second in equal portions among the HD PCCs 322C and 322D, as indicated in element 375. Thus, PCC 322C and 322D may each be assigned 37.5 Mbytes/second for the time slot for which throughput is currently being allocated. In other implementations, different approaches may be taken with respect to distributing the remainder throughput—e.g., it may be divided proportionately to respective demands of the HD PCCs, or a selected subset of the HD PCCs may be granted the MGT while a different subset is granted the remaining throughput, and so on. If the actual demands of any of the PCCs exceed their assigned limits in the next time slot, the AN may introduce inter-response delays such as 381A or 381B. At least in some cases, one or more of the SD PCCs may also exceed their assigned quotas, in which case delays may also be added to their response streams. In some embodiments, the AN may classify PCCs into more than two categories: e.g., if some PCCs have not been in use for some time, or if their throughput demand during some recent time interval is less than a particular threshold, such PCCs may be classified as "inactive", while the remaining PCCs may be classified as sustainable-demand or high-demand.

Token-Based Burst Throughput Management

Figure 4:
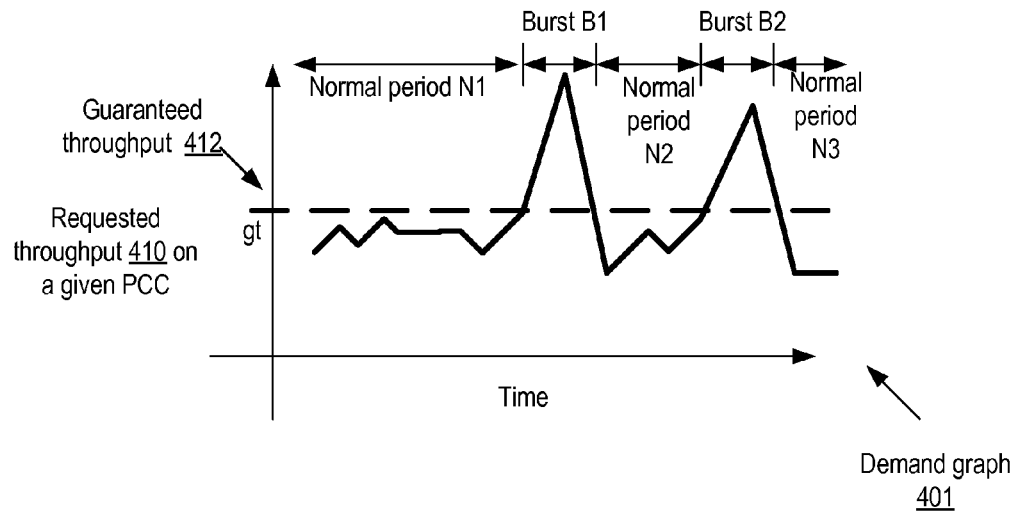
FIG. 4 illustrates an overview of the use of a token bucket for managing time-varying throughput requests at a file storage service, according to at least some embodiments.
Figure 4:
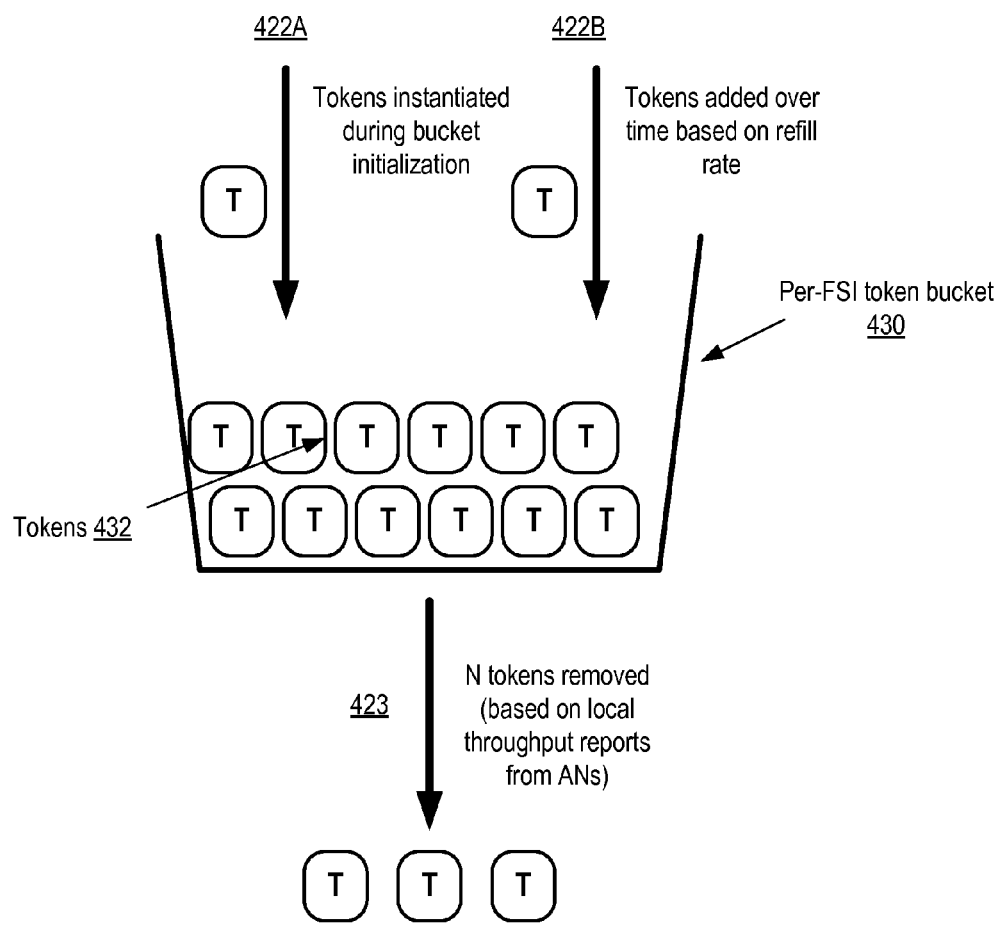

FIG. 4 illustrates an overview of the use of a token bucket for managing time-varying throughput requests at a file storage service, according to at least some embodiments. Demand graph 401A illustrates an example of work request arrival rate variations at a given persistent client connection, for which per-FSI token buckets such as bucket 430 may be used for throughput management in some embodiments. In graph 401A, the X-axis represents time, while the Y-axis represents the requested throughput rate 410 of requests received via a particular PCC. To simplify the presentation, the throughput requests indicated in graph 401A may be considered to include bytes transferred in either direction between a client and the file storage service (i.e., for both reads and writes). In some embodiments, read and write requests may be handled using distinct throughput management policies as discussed below. A guaranteed throughput 412 of the PCC, at least as of a particular point in time, is indicated by a horizontal line that intersects the Y-axis at "gt". As shown, the requested throughput varies substantially over time. During some time periods, the requested rate is less than the guaranteed rate, and the PCC is deemed to be in normal or sustainable mode during those time periods, such as normal periods N1, N2 and N3. During periods when the requested throughput exceeds gt, the PCC may be deemed to be in a burst mode of operation, such as during burst periods B1 and B2.

The file storage service may be obligated (e.g., contractually obligated by a service level agreement) to support provisioned throughput levels for respective FSIs, where the provisioned throughput for a given FSI may depend on various factors such as the size of the FSI, the billing rate associated with the FSI, etc. In at least some embodiments, the file storage service may attempt to set aside sufficient resources (e.g., sufficient storage capacity at the storage subsystem, and sufficient computing capacities at the access subsystem, the metadata subsystem, and the storage subsystem) to handle the contractually-obligated throughput levels. However, even if resources sufficient to meet the requirements for an FSI at a global level are provisioned, the bursty nature of the demand over any individual persistent connection as shown in graph 401 may still pose resource management problems for the service. In general, because of the session-oriented nature of the file system protocols in use, it may be impractical to simply terminate or close connections with high temporary request rates. Furthermore, during any given time slot, it may often be the case that some PCCs have very low demand (e.g., much lower than the guarantee) while others are experiencing high demands. Accordingly, a technique involving accumulating throughput tokens may be employed in various embodiments, in which, in effect, a right to high throughput levels may be obtained at least temporarily in exchange for periods of low throughput consumption.

In at least some such embodiments, a token bucket 430 may be assigned to each file system instance, e.g., at the time that the FSI is created. A mechanism that uses a single bucket of tokens is illustrated for simplicity of presentation, although in some embodiments combinations of multiple buckets may be used, such as one or more buckets for normal-mode operation, and one or more buckets for burst-mode operation. According to the mechanism, the token bucket 430 (e.g., a logical container of a collection of tokens, which may be implemented as a data structure within a software program in at least some embodiments) may be populated with an initial set of tokens 422A during bucket initialization. In at least one embodiment, a representation of the token bucket and its population (the current token count) may be stored in a persistent repository such as a relational or non-relational database to which a set of TMs designated for the FSI have read and write access. One or more TMs may maintain cached versions of the token bucket in local memory or local storage devices in some embodiments, so that access to the repository is not necessarily required during each throttling parameter determination iteration (TPDI). Any of several different levels of consistency models may be supported for the token buckets in various embodiments—e.g., in some cases eventual consistency may be sufficient, while in other embodiments strict consistency based on locking mechanisms of the repository may be used. The initial population of a token bucket may be determined based on various factors, e.g., based on a service level agreement, an indication received from a customer regarding the anticipated size of the FSI, or a default token count selected based on an assumption that a file system is likely to grow quickly shortly after it has been created. For some types of buckets the initial population may be set to zero in some embodiments. In some implementations the initial population of at least one bucket may be set to a maximum population for which the bucket is configured.

In one embodiment, during a particular throttling parameter determination iteration, a TM may change the number of tokens in the bucket 430 based on information received from the ANs and/or sizing updates regarding the FSI, and use the updated number of tokens to compute one or more throttling parameters for one or more ANs (e.g., including whether bursting is to be permitted, and/or what the maximum throughput allotment should be for the iteration). For example, based on the reported local throughputs corresponding to the PCCs set up for the FSI at various ANs, some number of tokens (N) may be removed from token bucket 430, as indicated by arrow 423. Each token may thus correspond to a number of bytes transferred (e.g., X kilobytes or megabytes) in the depicted embodiment. The bucket 430 may also be refilled or repopulated periodically, as indicated by arrow 422B. The refill rate may differ for different token buckets in some embodiments—e.g., it may be based on the size of the FSI. Thus, in general, the number of tokens 432 in the bucket for a given FSI may increase based on the refill rate, and decrease based on the aggregated reported throughputs of the PCCs for the FSI. During periods when the demand is low, tokens may accumulate, and such tokens may later be consumed to handle bursts of demand at one or more PCCs. Limits may be placed on the maximum number of tokens a bucket may hold in some embodiments, and/or on the minimum number of tokens, e.g., using configuration parameters of the kind discussed below with respect to FIG. 5. Using various combinations of configuration parameter settings, fairly sophisticated throughput management schemes may be implemented in different embodiments. In some embodiments, token buckets of the kind shown in FIG. 4 may be used at other granularities, e.g., in addition to or instead of at the per-FSI granularity—for example, in one embodiment, a per-customer token bucket may be set up, or respective token buckets may be set up for particular directories, particular files, or even for each persistent client connection. In at least some embodiments, each token may be used to represent some number of operations (e.g., reads or writes), e.g., instead of or in addition to being used to represent bytes transferred per second.

Figure 5:
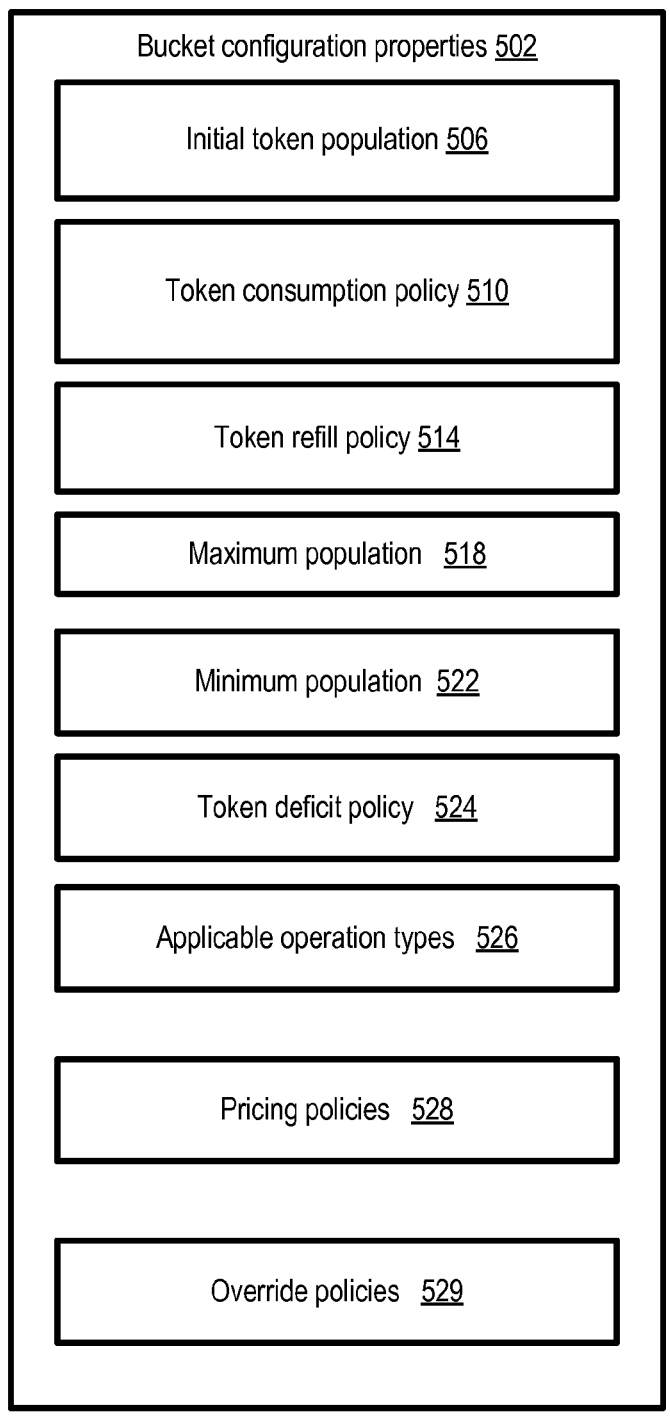
FIG. 5 illustrates example properties of a token bucket used for throughput throttling, according to at least some embodiments.

FIG. 5 illustrates example properties of a token bucket used for throughput throttling, according to at least some embodiments. In some implementations, as mentioned above, a token bucket for a given FSI may be implemented as a data structure managed collectively by one or more TMs, and may be written to persistent storage and/or accessed in local memory or local storage at the TMs as needed. At least some of the parameters shown in FIG. 5 may also be stored in a persistent repository in various embodiments.

Properties 502 may include an initial token population parameter 506 in the depicted embodiment, which indicates how many tokens are to be placed in the bucket at startup or initialization (e.g., when a file system instance is created). A token consumption policy 510 may indicate how tokens are to be consumed (e.g., how many tokens are to be removed from the bucket for a given amount of data transferred). In some embodiments different numbers of tokens may be consumed for different types of operations from a given bucket based on its consumption policy—e.g., a write of a given size may result in the consumption of m tokens, while a read of the given size may result in the consumption of n tokens. In some embodiments, a token consumption policy may also specify a decay-during-idle parameter indicating whether (and at what rate) tokens are to be deleted from the bucket if the corresponding FSI is not accessed for some time, or a transfer-upon-idle parameter indicating whether tokens should be transferred from one bucket to another if they are not used during some time interval. In one embodiment, a staleness policy may be used to remove tokens that have not been consumed for a specified time interval—e.g., each token may be associated with a validity lifetime after which the token may no longer be useful for throughput control purposes.

Token refill policy parameter 514 may indicate at what rate, and/or under what circumstances, tokens are to be added to the bucket, e.g., to help sustain a rate of requests for which the FSI associated with the bucket has been configured. In some embodiments, one or more of the parameters of the bucket may be changed over time—e.g., a default refill rate may apply to the bucket, but under certain conditions a non-default rate may be used, or the refill rate may be adjusted up or down based on the size of the corresponding FSI. Maximum population parameter 518 may indicate the maximum capacity of the bucket, while minimum population parameter 522 may indicate the lower bound for a bucket's population. A token deficit policy parameter 524 may specify rules about the conditions under which token deficits (or negative populations) are allowed, how long deficits are allowed to remain, what actions have to be taken to recover from a deficit, and so forth. In some embodiments, different types of operations may have different throughput throttling rules, and the types of operations (e.g., reads and/or writes) for which the bucket is to be used may be specified in applicable operation types parameter 526. In at least some embodiments, one or more pricing policies 528 that may be used to determine the amounts that customers are to be charged for the use of the bucket's tokens may be indicated in the bucket properties. Override policies parameter 529 may indicate the conditions (if any) under which one or more of the token bucket's other properties may be overwritten, and/or the entities which are permitted to override those policies. In different embodiments, only a subset of the example parameters shown in FIG. 5 may be employed, while in other embodiments, additional bucket configuration parameters beyond those shown in FIG. 5 may be used. Values and/or settings for various properties shown in FIG. 5, as well as other throughput throttling settings such as whether burst mode operation is to be supported at all, may be programmatically set or modified (e.g., using web service calls) in at least some embodiments.

File Storage Service Component Distribution Across Availability Containers

As mentioned earlier, in some embodiments a distributed file storage service may be implemented using resources of a provider network, and may be used for file-related operations by applications or clients running at compute instances of the provider network. In some embodiments a provider network may be organized into a plurality of geographical regions, and each region may include one or more availability containers, which may also be termed "availability zones" herein. An availability container in turn may comprise one or more distinct locations or data centers, engineered in such a way (e.g., with independent infrastructure components such as power-related equipment, cooling equipment, and physical security components) that the resources in a given availability container are insulated from failures in other availability containers. A failure in one availability container may not be expected to result in a failure in any other availability container; thus, the availability profile of a resource is intended to be independent of the availability profile of resources in a different availability container. Various types of applications may be protected from failures at a single location by launching multiple application instances in respective availability containers. Nodes of the various subsystems of the storage service may also be distributed across several different availability containers in some embodiments, e.g., in accordance with the availability/uptime goals of the service and/or the data redundancy requirements for various file system instances. At the same time, in some implementations, inexpensive and low latency network connectivity may be provided between resources (such as the hosts or storage devices being used for the distributed file storage service) that reside within the same geographical region, and network transmissions between resources of the same availability container may be even faster. Some customers may wish to specify the locations at which at least some of the resources being used for their file systems are reserved and/or instantiated, e.g., at either the region level, the availability container level, or a data center level, to maintain a desired degree of control of exactly where various components of their applications are run. Other customers may be less interested in the exact location where their resources are reserved or instantiated, as long as the resources meet the customer requirements, e.g., for performance, high availability, and so on.

In at least some embodiments, the resources within a given data center may be further partitioned into sub-groups based on differences in expected availability or failure resilience levels. For example, one or more server racks at a data center may be designated as a lower-level availability container, as the probability of correlated failures within a rack may at least in some cases be higher than the probability of correlated failures across different racks. At least in some embodiments, when deciding where to instantiate various components or nodes of the storage service, any combination of the various levels of availability containment described (e.g., the region level, the data center level, or at the rack level) may be taken into account together with performance goals and durability goals. Thus, for some types of storage service components, redundancy/replication at the rack level may be considered adequate, so in general different racks may be used for different components providing the same function (or storing replicas of the same data/metadata). For other components, redundancy/replication may also or instead be implemented at the data center level or at the region level.

Figure 6:
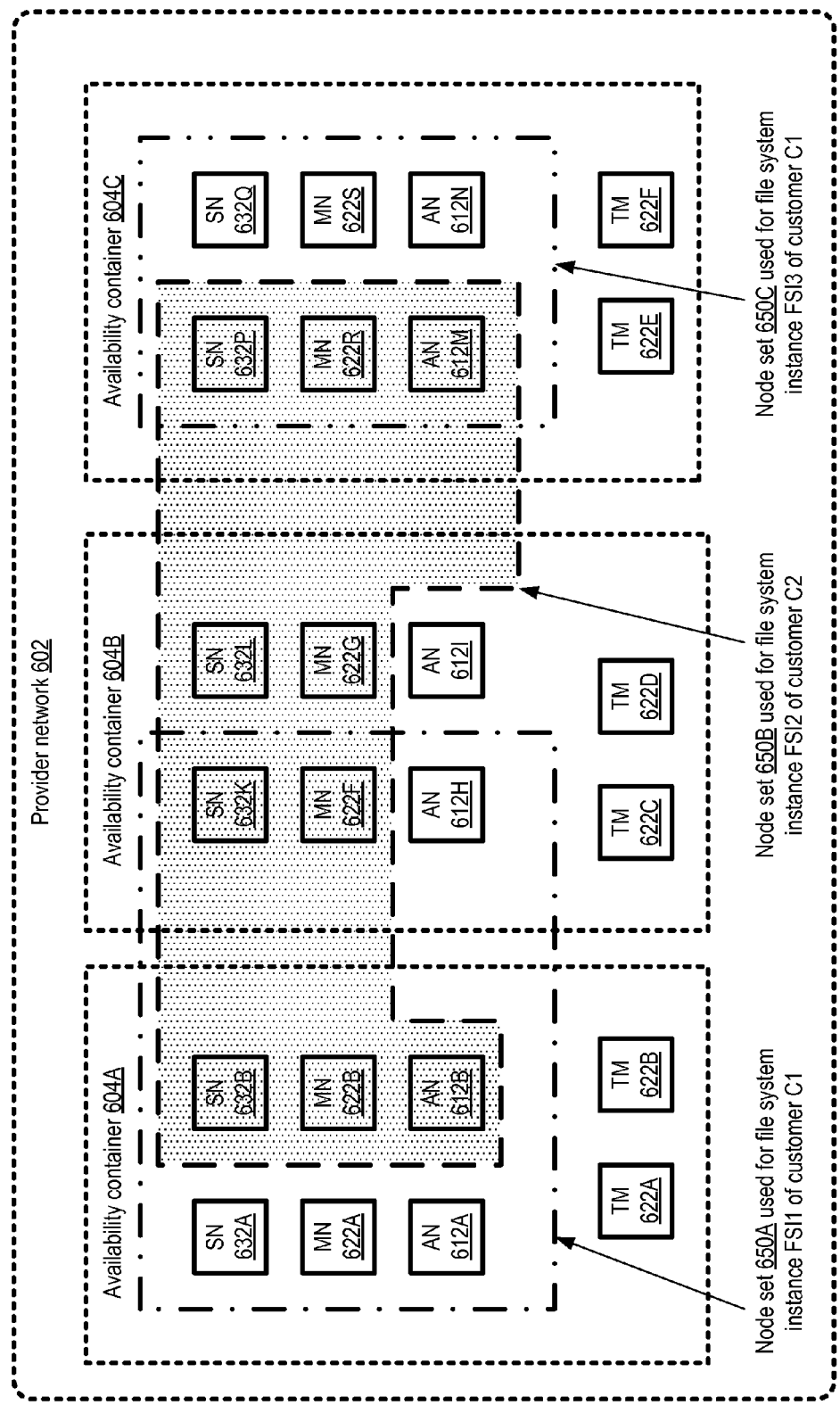
FIG. 6 illustrates an example of a distribution of components of a file storage service among a plurality of availability containers of a provider network, according to at least some embodiments.

FIG. 6 illustrates an example of a distribution of components of a distributed file storage service (DFSS) among a plurality of availability containers of a provider network, according to at least some embodiments. In the embodiment depicted, three availability containers 604A, 604B and 604C are shown, each of which comprise some number of storage nodes, metadata nodes, access nodes and throttling managers of the storage service. Since each availability container is typically set up so as to prevent correlated failure events that cross availability container boundaries, the set of DFSS nodes that are assigned to a given file system instance may typically be spread across different availability containers. It is noted that some file system instances may have lower availability or durability requirements than others, and may therefore be implemented within a single availability container in at least some embodiments. In one embodiment, when the DFSS is set up, a pool of nodes may be established for each of the three subsystems in each of several availability containers 604, from which specific nodes may be assigned to a given FSI as needed. In other embodiments, instead of establishing pre-configured storage service node pools, new nodes may be instantiated as needed.

The collection of access node (ANs), metadata nodes (MNs) and storage nodes (SNs) that collectively implement file storage for a given FSI may be referred to as a "node set" 650 for that FSI. In the embodiment shown in FIG. 6, the nodes of the DFSS are multi-tenant, in that a given node of any of the subsystems may be responsible for handling requests from several different client devices and/or several different customers. It is noted that in various embodiments, a given customer (e.g., a business entity or individual on whose behalf a billing account has been established at the storage service) may set up several different FSIs, and that many different client devices (computing devices from which DFSS programmatic interfaces may be invoked) may be used to issue file service requests to a single FSI by, or on behalf of, a given customer. In at least some embodiments, multiple user accounts (e.g., one or more user accounts for each of several employees of a customer business organization) may be set up under the aegis of a single billing account, and each of the user accounts may submit file storage requests from a variety of client devices.

Node set 650A of FIG. 6, used for file system instance FSI1 of customer C1, comprises SNs 632A, 632B and 632K, MNs 622A, 622B and 622F, and ANs 612A, 612B and 612H, distributed among two availability containers 604A and 604B. Node set 650B, used for file system instance FSI2 of a different customer C2, comprises nodes in three availability containers 604A, 604B and 604C: SNs 632B, 632K, 632L and 632P, MNs 622B, 622F, 622G and 622R, and ANs 612B and 612M. Node set 650C, used for file system instance FSI3 of customer C1, uses nodes of availability container 604C alone: SNs 632P and 632Q, MNs 622R and 622S, and ANs 612M and 612N. The specific nodes that are to be used for a given FSI may be selected on demand based on various factors, e.g., by a placement component of the storage service, and the node set may change over time in view of changing storage space needs, performance needs, failures and the like. A given storage device at a single storage node may store data and/or metadata belonging to different clients in at least some embodiments.

In addition to the ANs, MNs and SNs, each availability container 604 may comprise some number of throughput managers (TMs) in the depicted embodiment. For example, TMs 622A and 622B are set up in availability container 604A, TMS 622C and 622D are set up in availability container 604B, and TMs 622E and 622F are set up in availability container 604C. Each TM 622 may be configured to determine throttling parameters to be used for one or more FSIs in the depicted embodiment, and may communicate with other TMs within its availability container and/or across availability container boundaries to generate their global views of FSI connection counts and throughputs. The decisions made by a particular TM during a particular throttling parameter determination iteration (TPDI) may be conveyed to one or more ANs 612 within at least the same availability container. For example, TMs 622A and 622B may transmit updated throttling parameters periodically to ANs 612A and 612B, while TMs 622C and 622D may transmit updated throttling parameters to ANs 612H and 612I and TNs 622E and 622F may transmit updated throttling parameters to ANs 612M and 612N. In at least some embodiments, a given TM may also communicate with one or more ANs in other availability containers. By establishing multiple TMs in different availability containers, a high level of availability and failure resiliency may be supported for the throughput throttling capabilities in the depicted embodiment. At least some of the TMs may be capable of taking over the responsibilities of other TMs—e.g., TM 622A's failure may result in a failover to TM 622B. In at least some implementations, a particular TM 622 may also be configured to take over throttling parameter determination operations for ANs in other availability containers—e.g., if both TMs 622A and 622B fail, TM 622C may start determining throttling parameters for ANs of availability container 604A.

Methods for Throughput Throttling at Large-Scale File Storage Services

Figure 7:
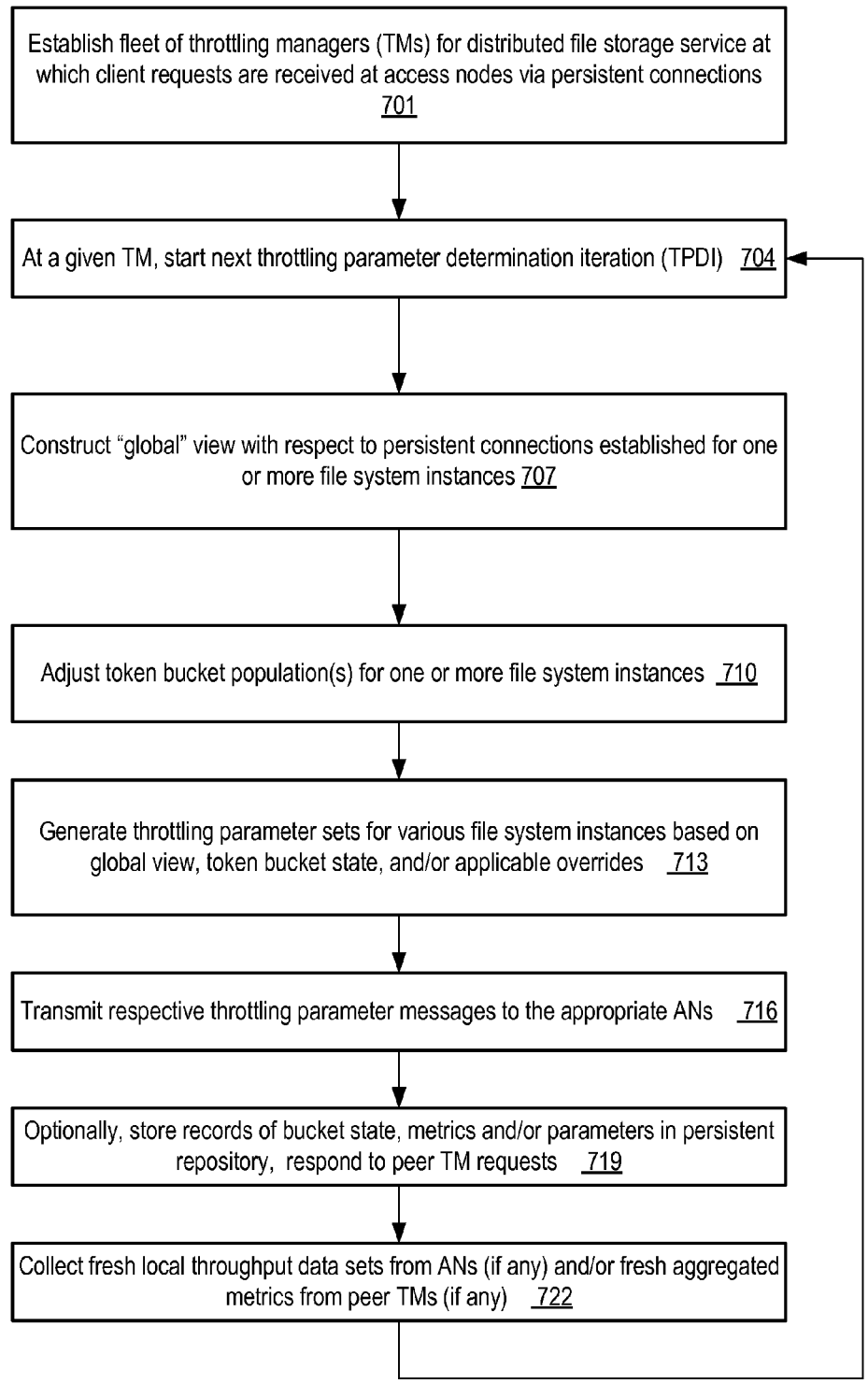
FIG. 7 is a flow diagram illustrating aspects of operations that may be performed by a throttling manager of a distributed file storage service, according to at least some embodiments.

FIG. 7 is a flow diagram illustrating aspects of operations that may be performed by a throttling manager of a distributed file storage service, according to at least some embodiments. During an initialization phase (element 701), a fleet of throttling managers may be established, e.g., with k TMs in each availability container of a provider network as indicated in FIG. 6. Each of the TMs may be configured to implement throughput control policies, e.g., using FSI size information, local throughput information collected from various access nodes, and token buckets of the kind described above to manage bursty demand patterns at various persistent client connections (PCCs) used to fulfill client requests directed at FSIs of the DFSS. When a new FSI is created, one or more token buckets or collections and a set of one or more TMs may be assigned to it, and an initial set of properties to be used for throughput control may be propagated to each of the TMs. In some embodiments, a fixed number of TMs may be assigned to each FSI at least initially (e.g., a primary TM and a secondary TM may be assigned within each availability container being used for the FSI). In other embodiments the number of TMs initially assigned to an FSI may depend at least in part on any of various factors such as an expected size or growth rate of the FSI, a billing rate associated with the FSI, or customer-specific service level agreements. Each TM may schedule and implement a sequence of throttling parameter determination iterations (TPDIs) for each of the FSIs for which it is responsible. In some embodiments, in scenarios in which multiple TMs are assigned to a given FSI, each of the TMs may perform its TPDIs asynchronously with respect to the other TMs, e.g., some amount of randomness or jitter may be added to each inter-iteration interval. In some embodiments, the TM may compute throttling metrics for several different FSIs within a given iteration, while in other embodiments a separate sequence of TPDIs may be implemented for each FSI.

Based on its particular schedule, a given TM may start its next TPDI for one or more FSIs (element 704). Using come combination of factors such as (a) local throughput data sets received from various ANs, (b) throughput and/or connection count metrics received from peer TM(s), e.g., via gossip protocol, and/or (c) updated size estimates of the FSI, the TM may construct a "global" view of the one or more FSIs in terms of connection counts, throughput demands, and allocation limits for the TPDI (element 707). The TM may adjust the number of tokens in a respective token bucket for the one or more FSIs (element 710), e.g., based on a refill rate applicable to each bucket and/or based on the aggregated per-PCC throughputs reported by the ANs. In at least some embodiments, one or more token bucket parameters, such as the refill rate itself, the maximum number of tokens permitted in the bucket, and/or the minimum number of tokens permitted in the bucket, may also be adjusted, based for example on the latest available size estimate for the corresponding FSI.

The TM may use the token bucket states, the collected local throughput reports, and/or metrics received from its peer TMs to arrive at a set of throttling parameters to be provided to one or more ANs (element 713). In at least some embodiments, the TM may apply a time-decay function to at least some of the information it collects for parameter determination—that is, information received more recently may be assigned a higher weight than information received earlier. For example, a time-weighted average of some number of recent local throughput metrics for a given set of PCCs may be used, instead of simply using the most recent metric, when determining the expected demand for that set of PCCs for the TPDI. In some embodiments, the TM may also attempt to discover whether any override policies have been set up for the FSIs whose throttling parameters are being computed. If any such overrides (e.g., either global overrides, or overrides at a per-FSI level or a per-PCC level) are in effect, the TM may alter the throttling parameters accordingly. The throttling parameters may be transmitted to a set of ANs (element 716), where they are to be used to classify the PCCs and distribute the MTA among the PCCs.

In at least one embodiment, some or all of the computations performed by the TM may use an in-memory (i.e., RAM-based) cache of the collected inputs—e.g., in order to ensure that the throttling parameters are performed as quickly as possible, the TM may avoid reading from or writing to persistent (e.g., rotating-disk-based) storage devices to the extent possible. In some implementations, e.g., if there is insufficient RAM for all the information needed for the throttling parameter computations, the TM may use local persistent storage devices such as solid-state drives (SSDs) or disks. In various embodiments, a given TM may periodically or occasionally store some of its throttling-related data at an external persistent repository such as a database (element 719). For example, records of the token bucket state, the metrics collected, and/or the parameters determined by a TM may optionally be stored in such a persistent repository. In addition, the TM may also respond to queries or requests received from peer TMs in at least some embodiments, e.g., by providing aggregated local throughput information for at least the set of ANs from which the TM has received throughput reports. In some embodiments, instead of or in addition to exchanging information with its peer TMs about throughput and connection counts of the particular ANs with which a given TM (say, TM-j) communicates directly, TM-j may simply exchange its global views with respect to one or more FSIs.

Fresh local throughput reports and peer-TM-provided information may be collected, if any is received during the TPDI (element 722), before the next TPDI is begun in accordance with the scheduling policy in use (e.g., after a fixed delay, or after a randomized delay) in the depicted embodiment. Operations corresponding to elements 704-722 may then be repeated for the next TPDI, with the latest available data as input. It is noted that at least in some embodiments, it may sometimes be the case that a TM does not receive any new input data usable for its throttling parameter calculations for some time. This may occur for a number of reasons—for example, some messages sent by ANs or peer TMs may be lost in transit, some of the ANs or the peer TMs may have failed or be experiencing a network partition incident. In some implementations, a given TM may only re-compute and transmit throttling parameters for a given FSI to ANs if it has received at least some updated input data (e.g., either new local throughput metrics, new aggregated metrics from peer TMs, or new size information) since the previous throttling parameter set was transmitted. In other implementations, a given TM may transmit throttling parameter set messages to ANs periodically regardless of whether new input was received, so that, for example, the ANs are at least informed that the TM is up and running. It is noted that even in scenarios in which updated information is received at the TM, the throttling parameters sent to ANs in successive TPDIs may not necessarily have changed. For example, if, during a given TPDI, the TM computes the maximum throughput allotment as 200 Mbytes/sec and the MGT as 25 Mbytes/sec, this does not mean that one or both of those values would necessarily be different in the next TPDI.

Figure 8:
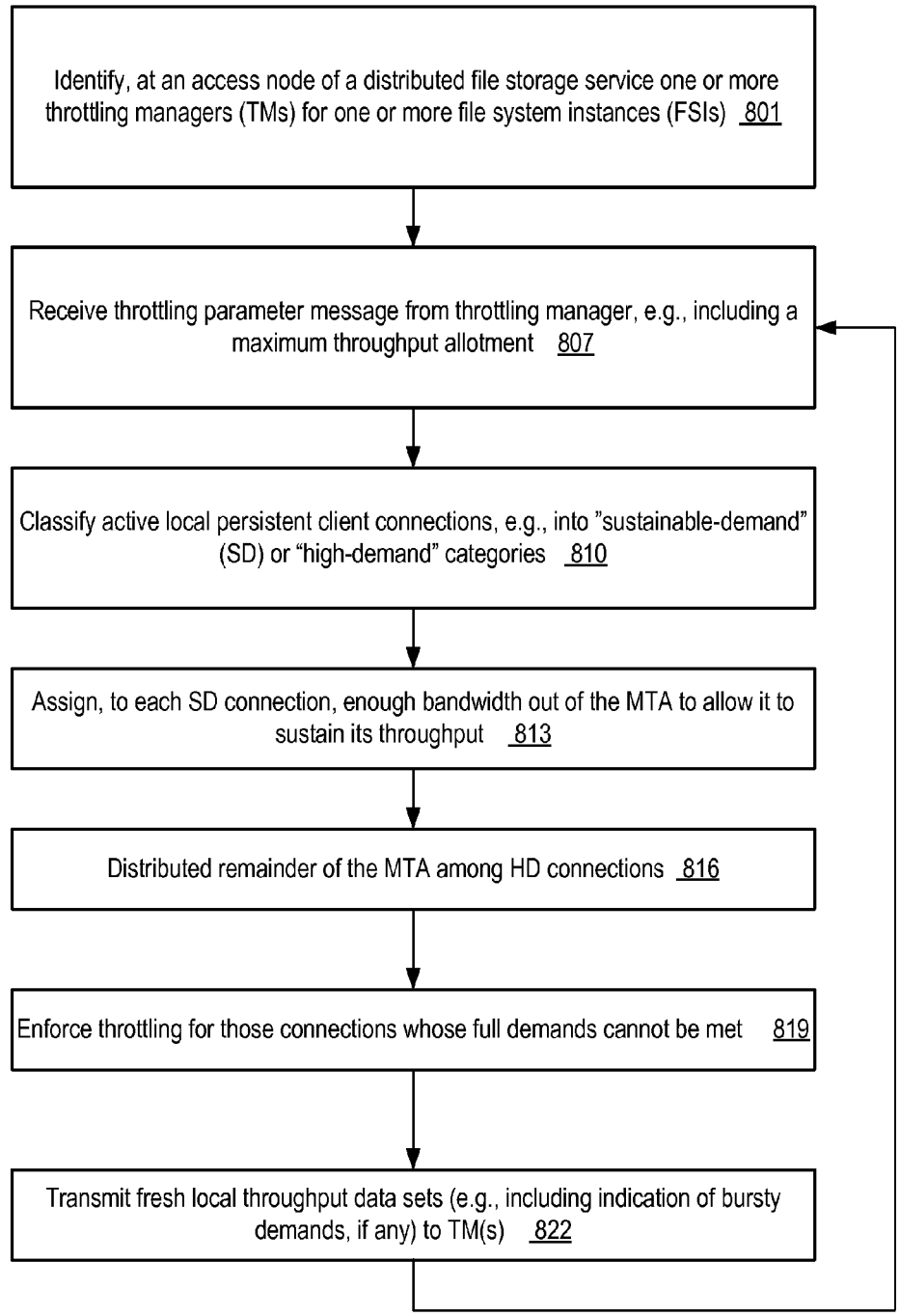
FIG. 8 is a flow diagram illustrating aspects of throughput management operations that may be performed at an access node of a distributed file storage service, according to at least some embodiments.

FIG. 8 is a flow diagram illustrating aspects of throughput management operations that may be performed at an access node (AN) of a distributed file storage service, according to at least some embodiments. An access node with one or more persistent client connections (PCCs) used for accesses to one or more FSIs of the DFSS may identify one or more TMs designated for determining throttling parameters for the FSIs (element 801). The AN may establish connectivity with at least one of the TMs identified, and implement a sequence of throttling implementation iterations corresponding to the parameter determination iterations of the TM. Each throttling implementation iteration may correspond to a respective successive time slot (e.g., some number of milliseconds or seconds).

In the depicted embodiment, each throttling implementation iteration may be triggered by the receipt of a throttling parameter message from a TM (element 807). The message may include values for one or more parameters, such as an MTA (maximum throughput allotment) for the set of PCCs established for a given FSI, a minimum guaranteed throughput (MGT) for each PCC which may be used for classifying PCCs, and/or a bursting acceptance indicator (e.g., an indication as to whether some number of tokens are present in a token bucket established for the FSI). In some embodiments, the MTA may implicitly indicate whether bursting is permissible or not during the throttling implementation iteration—e.g., a separate bursting-related parameter may not be required. In at least some embodiments, instead of receiving a single MTA and/or a single MGT, the AN may receive respective throughput limits (e.g., a respective maximum and/or a respective guaranteed minimum) for some number of PCCs. In one embodiment, an AN may receive some of the metrics which can be used to compute the MTA and/or the MGT, instead of receiving pre-computed values for one or more of the parameters. For example, a TM may simply provide each AN with a representation of its global view of an FSI, and the AN may then determine how much throughput should be allocated to various PCCs.

In the embodiment shown in FIG. 8, the AN may classify its PCCs into at least two categories (element 810): a sustainable-demand (SD) category and a high-demand (HD) category, e.g., based on the relationship between the expected throughput demands of the PCCs and the MGT. Those PCCs whose requested throughput metrics (e.g., calculated by applying a time-based decay function to some recent set of measured throughputs) indicate that the MGT would be sufficient for the time slot being considered may be classified as SD, while the remaining PCCs may be classified as HD in some embodiments. In other embodiments, more than two categories may be used. It is noted that one or both of the MGT and the MTA may change from one iteration to another, e.g., based on the changing size of the FSI and/or on other factors.

If the AN has placed at least one PCC into the SD category, the AN may then assign respective portions of the MTA to each SD PCC, such that the expected demand for the time slot can be sustained (element 813). For example, if the MGT is 20 Mbytes/sec and the expected demand (based on an adjusted average of recent measured throughput) of a particular PCC is 10 Mbytes/second, the AN may assign 10 Mbytes/second to the PCC for the time slot. After all the SD PCCs have been assigned respective throughputs, the AN may divide the remainder of the MTA among the HD PCCs (element 816). In some implementations, each HD PCC may be granted an equal share of the remainder of the MTA, while in other implementations, some HDs may be granted more of the throughput than others (e.g., proportionately to their expected demands, or so as to allow at least some HDs to receive all the expected requested throughput).

The AN may use one or more pacing mechanisms to enforce the limits on the throughputs assigned to each PCC during the time slice for which the assignments were made (element 819), e.g., by inserting delays between responses, and/or by delaying internal messages to back-end nodes such as metadata nodes or storage nodes of the DFSS. Metrics on the actual throughputs achieved and/or requested by the different PCCs during the time slice may be obtained and provided to the TM(s) (element 822). In at least one embodiment, the AN may also indicate to the TM(s) whether some or all of the PCCs were exhibiting burst-mode behavior (e.g., short durations of very high demand). The information provided by the AN may then be used by the TM(s) for subsequent TPDIs. The AN may repeat the operations corresponding to elements 807 onwards in its next throttling implementation iteration.

It is noted that in various embodiments, some of the operations shown in the flow diagrams of FIG. 7 and FIG. 8 may be omitted or performed in a different order than that shown, or may be performed in parallel rather than serially.

Use Cases

The techniques described above, of implemented an iterative, failure-resilient algorithm independently at various nodes of a distributed file storage service to determine throughput control parameters for persistent client connections may be useful in several different scenarios. For example, in environments where file storage operation performance is expected to scale with the size of the file system instances, the service may be designed to ensure that sufficient resources are allocated to growing file systems, while at the same time ensuring that individual client connections are provided at least a minimum level of service. The asynchronous design of the technique described herein may help keep the overhead of the throttling parameter determinations, as the use of locks or other heavyweight consistency mechanisms can be avoided.

Illustrative Computer System

Figure 9:
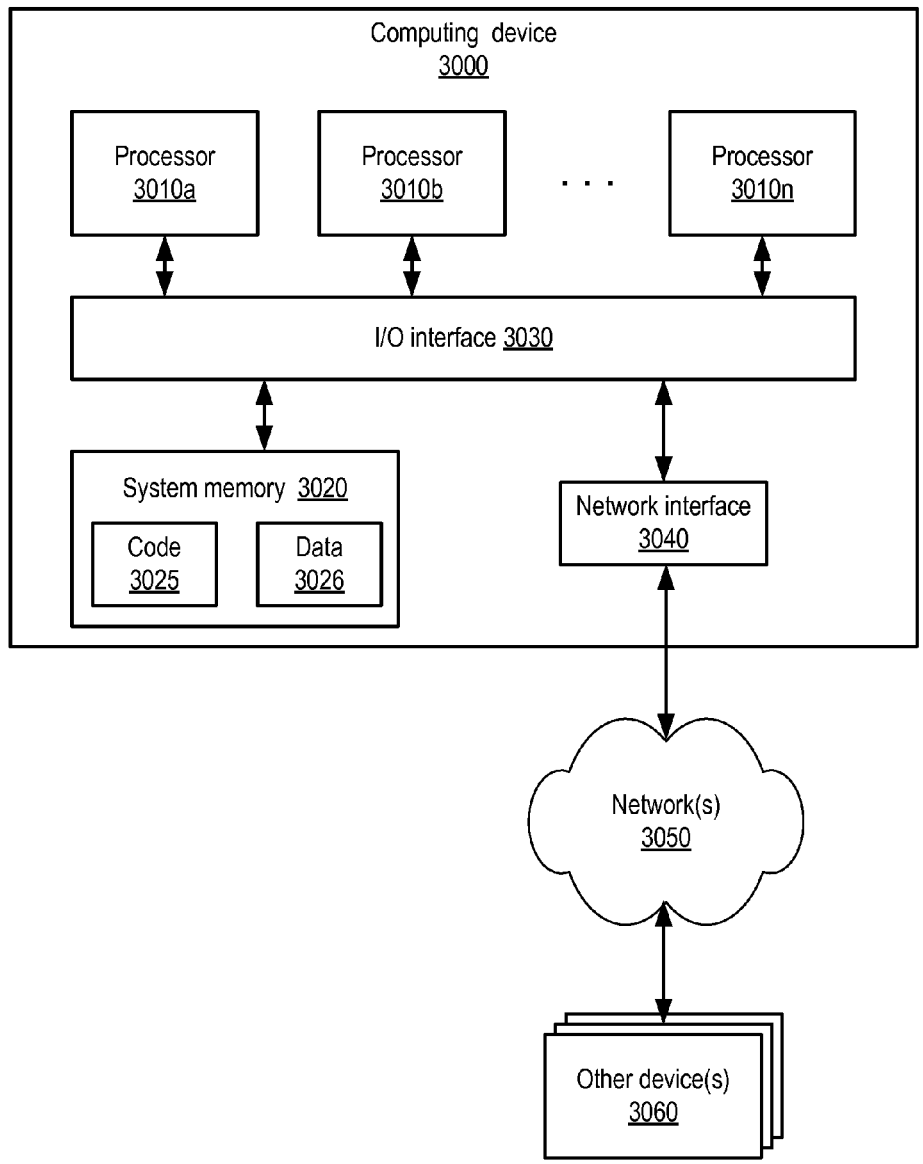
FIG. 9 is a block diagram illustrating an example computing device that may be used in at least some embodiments.

In at least some embodiments, a server that implements a portion or all of one or more of the technologies described herein, including the techniques to implement the throttling managers, access nodes, metadata nodes, storage nodes, size update proxies and/or other components of a distributed file storage service, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, which may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of access nodes (ANs) of a distributed file storage service implemented at a provider network, including a first AN designated as a member of a first AN group collectively responsible for processing received client requests directed to at least a first file system instance (FSI); and
   one or more throttling managers implemented at one or more computing devices, including a first throttling manager associated with at least the first FSI;
   wherein the first throttling manager is configured to perform a plurality of throttling parameter determination iterations (TPDIs), wherein a particular TPDI of the plurality of TPDIs comprises transmitting, to the first AN, a throttling parameter set including a maximum throughput allotment (MTA) for the first FSI, wherein the MTA is determined based at least in part on one or more of (a) an estimated size of the first FSI or (b) a population of a token collection associated with the first FSI, wherein the tokens of the token collection correspond to respective amounts of throughput; and
   wherein the first AN is configured to:
      classify, based at least in part on respective sets of throughput metrics, individual ones of a plurality of persistent connections established to enable clients of the file storage service to access the first FSI into (a) a sustainable-demand (SD) category or (b) a high-demand (HD) category;
      assign, to one or more SD persistent connections, a portion of the MTA enabling the respective SD persistent connections to sustain respective throughput rates for at least a particular time corresponding to the particular TPDI;

assign, to one or more HD persistent connections for at least the particular time, a portion of a remainder throughput allotment, wherein the remainder throughput allotment is obtained by subtracting, from the MTA, at least a sum of throughputs assigned to the one or more SD persistent connections; and enforce throughput assignments of the plurality of persistent connections.

2. The system as recited in claim 1, wherein the first throttling manager is further configured to:

receive, from the first AN, an indication of a measured throughput associated with a particular connection of the plurality of persistent connections;

estimate, based on inputs received from one or more ANs including the first AN, an aggregate throughput with respect to the first FSI;

remove one or more tokens from the token collection based at least in part on the aggregate throughput; and add one or more tokens to the token collection based at least in part on a token refill rate associated with the first FSI.

3. The system as recited in claim 1, wherein the first AN group comprises a second AN, wherein the first throttling manager is configured to:

transmit, to the second AN during the first TPDI, a second throttling parameter set; and receive, from the first AN and the second AN, respective indications of measured throughputs of one or more persistent connections associated with the first FSI.

4. The system as recited in claim 1, wherein the distributed file storage service comprises a second AN associated with a second FSI, wherein the first throttling manager is configured to:

transmit, to the second AN during a different TPDI associated with the second FSI, a different throttling parameter set corresponding to the second FSI; and receive, from the second AN, respective indications of measured throughputs of one or more persistent connections established at the second AN and associated with the second FSI.

5. The system as recited in claim 1, wherein the distributed file storage service comprises a second throttling manager associated with the first FSI, wherein the first throttling manager is configured to:

transmit, to the second throttling manager, a query for cached throughput metrics pertaining to at least the first FSI; and receive, from the second throttling manager, a response comprising one or more throughput metrics obtained at the second throttling manager from a different AN.

6. A method, comprising:

performing, by a first throttling manager associated with a first file system instance of a distributed file storage service, throttling parameter determinations, wherein a particular throttling parameter determination comprises transmitting, to a first access node of a plurality of access nodes of the service associated with the first file system instance, a throttling parameter set including a maximum throughput allotment for the first file system instance, wherein the maximum throughput allotment is determined based at least in part on an updated estimate of a size of the first file system instance, wherein the updated estimate is obtained for the particular throttling parameter determination;

assigning, by the first access node, to one or more sustainable-demand connections of a plurality of persistent connections established for client access to the first file system instance, a respective portion of the maximum throughput allotment, enabling the respective sustainable-demand connections to sustain respective throughput rates for at least a particular time;

assigning, by the first access node, to one or more high-demand connections of the plurality of persistent connections, for at least the particular time, a portion of a remainder throughput allotment, wherein the reminder throughput allotment is obtained by subtracting, from the maximum throughput allotment, at least a sum of throughputs associated with the one or more sustainable-demand connections; and enforcing throughput assignments of the plurality of persistent connections.

7. The method as recited in claim 6, further comprising:

classifying, by the first access node based at least in part on one or more of (a) a throughput metric of a particular connection of the plurality of persistent connections or (b) a parameter indicated in the throttling parameter set, the particular connection into a sustainable-demand category or a high-demand category.

8. The method as recited in claim 6, wherein the maximum throughput allotment is further based at least in part on a population of a token collection associated with the first file system instance.

9. The method as recited in claim 8, further comprising:

receiving, by the first throttling manager from the first access node, an indication of a measured throughput associated with a particular connection of the plurality of persistent connections;

estimating, by the first throttling manager based on inputs received from one or more access nodes including the first access node, an aggregate throughput with respect to the first file system instance;

removing, by the first throttling manager, one or more tokens from the token collection based at least in part on the aggregate throughput; and adding, by the first throttling manager, one or more tokens to the token collection based at least in part on a token refill rate associated with the first file system instance.

10. The method as recited in claim 9, further comprising:

modifying, by the first throttling manager, the token refill rate based at least in part on another updated estimate of the size of the first file system instance.

11. The method as recited in claim 6, wherein the distributed file storage service comprises a plurality of throttling managers including a second throttling manager associated with the first file system instance, further comprising:

storing, by the first throttling manager, at least a portion of the throttling parameter set in a persistent repository accessible by the second throttling manager.

12. The method as recited in claim 6, wherein the distributed file storage service comprises a second access node associated with the first file system instance, further comprising:

transmitting, by the first throttling manager to the second access node, a second throttling parameter set; and transmitting, to the first throttling manager by the first access node and the second AN, respective indications of measured throughputs of one or more persistent connections associated with the first file system instance.

13. The method as recited in claim 6, wherein the distributed file storage service comprises a second access node associated with a second file system instance, further comprising:
- transmitting, by the first throttling manager to the second access node, a different throttling parameter set corresponding to the second file system instance; and
- transmitting, to the first throttling manager by the second access node, respective indications of measured throughputs of one or more persistent connections established at the second access node and associated with the second file system instance.

14. The method as recited in claim 6, wherein the distributed file storage service comprises a second throttling manager associated with the first file system instance, further comprising:
- transmitting, to the second throttling manager by the first throttling manager a query for throughput metrics pertaining to at least the first file system instance; and
- receiving, from the second throttling manager at the first throttling manager, a response comprising one or more throughput metrics obtained at the second throttling manager from a different AN.

15. The method as recited in claim 14, wherein the first throttling manager is implemented at a host associated with a first availability container of a provider network, and wherein the second throttling manager is implemented at a different host associated with a second availability container of the provider network.

16. A non-transitory computer-accessible storage medium storing program instructions that when executed on one or more processors implement a first access node of a file storage service, wherein the first access node is a member of a first access node group comprising more than one access nodes collectively responsible for processing received client requests directed to at least a first file system instance, wherein the first access node is configured to perform a plurality of throughput throttling determinations, wherein a particular throughput throttling determination of the plurality of throughput throttling determinations comprises:
- classifying, based at least in part on respective sets of throughput metrics, individual ones of a plurality of persistent connections associated with the first file system instance into (a) a sustainable-demand category, or (b) a high-demand category;
- receiving an indication of a maximum throughput allocation associated with the first file system instance, wherein the maximum throughput allotment is based at least in part on an estimated size of the first file system instance;
- assigning, to one or more sustainable-demand persistent connections, a portion of the maximum throughput allotment, to enable the respective sustainable-demand persistent connections to sustain respective throughput rates for at least a particular time;
- assigning, to one or more high-demand persistent connections, respective portions of a remainder throughput allotment, wherein the remainder throughput allotment is obtained by subtracting, from the maximum throughput allotment, at least a sum of throughputs assigned to the one or more sustainable-demand persistent connections; and
- enforcing throughput assignments of the plurality of persistent connections.

17. The non-transitory computer-accessible storage medium as recited in claim 16, wherein the client requests directed to at least the first file system instance are formatted in accordance with one of: (a) a version of an NFS (Network File System) protocol or (b) a version of an SMB (Server Message Block) protocol.

18. The non-transitory computer-accessible storage medium as recited in claim 16, wherein the indication of the maximum throughput allotment is received at the first access node from a first throttling manager of the file system service, and wherein the first access node is configured to transmit, to the first throttling manager, respective indications of throughput metrics of one or more persistent connections associated with the first file system instance.

19. A non-transitory computer-accessible storage medium storing program instructions that when executed on one or more processors implement a first throttling manager of a file storage service, wherein the first throttling manager is configured to perform a plurality of throttling parameter determinations, wherein a particular throttling parameter determination of the plurality of throttling parameter determinations comprises:
- receiving respective throughput updates from one or more access nodes of the file storage service, wherein a particular throughput update comprises an indication of a measured throughput of at least one persistent connection established to access a first file system instance at a first access node of the one or more access nodes;
- computing a maximum throughput allotment for the first file system instance based at least in part on one or more of (a) an estimate of a size of the first file system instance or (b) a population of a token collection associated with the first file system instance; and
- transmitting a first throttling parameter set to at least one access node of the one or more access nodes.

20. The non-transitory computer-accessible storage medium as recited in claim 19, wherein the particular throttling parameter determination comprises:
- estimating an aggregate measured throughput with respect to the first file system instance;
- removing one or more tokens from the token collection based at least in part on the aggregate throughput; and
- adding one or more tokens to the token collection based at least in part on a token refill rate associated with the first file system instance.

21. The non-transitory computer-accessible storage medium as recited in claim 20, wherein the first throttling manager is further configured to:
- modify the token refill rate based at least in part on an updated estimate of the size of the first file system instance.

22. The non-transitory computer-accessible storage medium as recited in claim 19, wherein the one or more access nodes include a second access node associated with the first file system instance and a third access node associated with a second file system instance, wherein the first throttling manager is further configured to:
- transmit, to the second access node, a second throttling parameter set corresponding to the first file system instance; and
- transmit, to the third access node, a third throttling parameter set corresponding to the second file system instance.

* * * * *